(12) United States Patent
Koyata et al.

(10) Patent No.: US 6,407,972 B1
(45) Date of Patent: Jun. 18, 2002

(54) EDITING APPARATUS AND EDITING METHOD

(75) Inventors: Tomohiro Koyata, Tokyo; Junichi Aramaki, Chiba; Ryohei Yasuda, Kanagawa; Akira Oba, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/680,010

(22) Filed: Oct. 5, 2000

(30) Foreign Application Priority Data

Oct. 20, 1999 (JP) ............................................. 11-298811

(51) Int. Cl.[7] ................................................. G11B 7/00
(52) U.S. Cl. ........................ 369/83; 369/59.1; 369/47.1
(58) Field of Search ............................ 369/47.1, 47.11, 369/47.15, 47.16, 47.24, 47.35, 53.1, 59.1, 59.13, 59.22, 83, 84; 375/240.24; 358/430; 714/752

(56) References Cited

U.S. PATENT DOCUMENTS 5,337,049 A * 8/1994 Shimoda ............ 375/240.24 X
6,298,460 B1 * 10/2001 Sasaki et al. ................ 714/752

* cited by examiner

*Primary Examiner*—Muhammad Edun
(74) *Attorney, Agent, or Firm*—Oblon, Spivak, McClelland, Maier & Neustadt, P.C.

(57) ABSTRACT

The present invention is an editing apparatus and an editing method for allowing the user to designate a desired portion of a particular program recorded as a highly efficient encoded digital signal on a record medium, reproducing the portion designated by the user, changing normalization information contained in the reproduced digital signal, performing a sound field process for the digital signal, and recoding the resultant signal to the record medium, wherein the record position of the program is edited corresponding to the designated portion.

28 Claims, 21 Drawing Sheets

Fig. 3

| | | |
|---|---|---|
| 0 | BLOCK SIZE MODE INFORMATION | |
| 1 | NUMBER OF CONTAINED UNIT BLOCKS AND DUAL WRITE INFORMATION | |
| 2 | BIT ALLOCATION INFORMATION | |
| | SCALE FACTOR INFORMATION | |
| | SPECTRUM DATA | 212 BYTES |
| | SCALE FACTOR DUALLY WRITTEN | |
| | BIT ALLOCATION DUALLY WRITTEN | |
| 210 | FIRST BYTE DATA DUALLY WRITTEN | |
| 211 | 0-th BYTE DATA DUALLY WRITTEN | |

Fig. 4

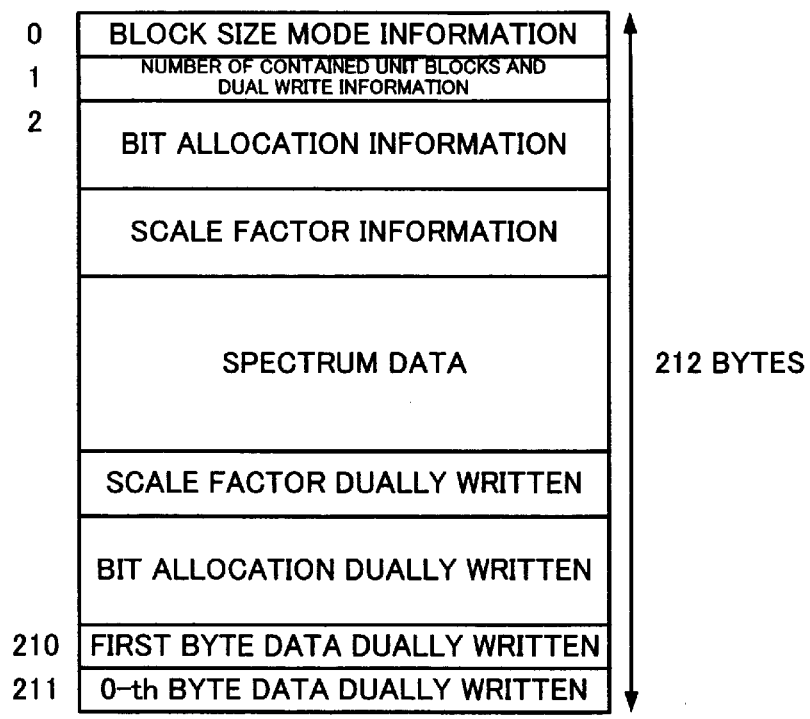

| NUMBER OF UNIT BLOCKS CONTAINED | | BIT ALLOCATION INFORMATION DUALLY WRITTEN | | SCALE FACTOR INFORMATION DUALLY WRITTEN | |
|---|---|---|---|---|---|
| CODE | QTY | CODE | QTY | CODE | QTY |
| 000 | 20 | 00 | 0 | 000 | 0 |
| 001 | 28 | 01 | 28 | 001 | 8 |
| 010 | 32 | 10 | 44 | 010 | 12 |
| 011 | 36 | 11 | 52 | 011 | 16 |
| 100 | 40 | | | 100 | 24 |
| 101 | 44 | | | 101 | 36 |
| 110 | 48 | | | 110 | 44 |
| 111 | 52 | | | 111 | 52 |

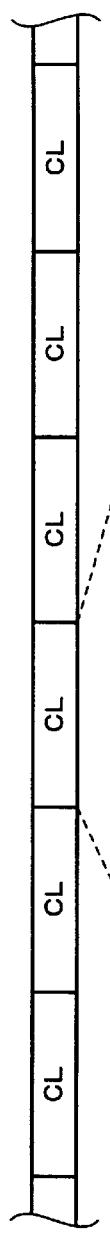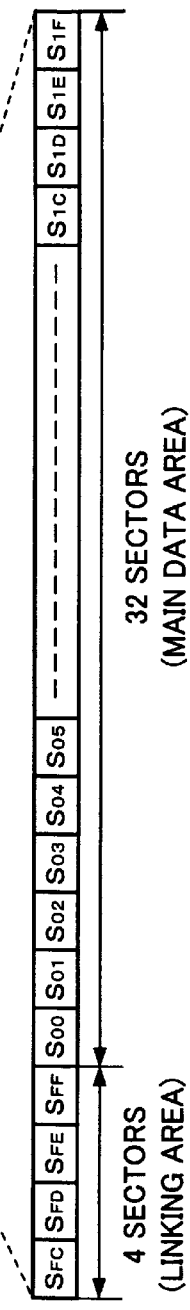
Fig. 17A
Fig. 17B

Fig. 19

| | | MSB      LSB | MSB      LSB | MSB      LSB | MSB      LSB | |
|---|---|---|---|---|---|---|
| HEADER | { | 00000000 | 11111111 | 11111111 | 11111111 | 0 |
| | | 11111111 | 11111111 | 11111111 | 11111111 | 1 |
| | | 11111111 | 11111111 | 11111111 | 00000000 | 2 |
| | | Cluster H | Cluster L | Sector (00h) | MODE (02h) | 3 |
| CORRELATION TABLE DESIGNATION DATA PORTION | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | First TNO | Last TNO | 7 |
| | | 00000000 | 00000000 | 00000000 | Used Sectors | 8 |
| | | 00000000 | 00000000 | 00000000 | 00000000 | 9 |
| | | 00000000 | 00000000 | 00000000 | Disc Serial No | 10 |
| | { | Disc | ID | P-DFA | P-EMPTY | 11 |
| | | P-FRA | P-TNO1 | P-TNO2 | P-TNO3 | 12 |
| | | P-TNO4 | P-TNO5 | P-TNO6 | P-TNO7 | 13 |
| | | P-TNO248 | P-TNO249 | P-TNO250 | P-TNO251 | 74 |
| | | P-TNO252 | P-TNO253 | P-TNO254 | P-TNO255 | 76 |
| | | 00000000 | 00000000 | 00000000 | 00000000 | 75 |
| | | 00000000 | 00000000 | 00000000 | 00000000 | 77 |
| MANAGEMENT TABLE PORTION (255 PART TABLES) | (01h) | START ADDRESS | | | TRACK MODE | 78 |
| | | END ADDRESS | | | LINK INFO. | 79 |
| | (02h) | START ADDRESS | | | TRACK MODE | 80 |
| | | END ADDRESS | | | LINK INFO. | 81 |
| | (03h) | START ADDRESS | | | TRACK MODE | 82 |
| | | END ADDRESS | | | LINK INFO. | 83 |
| | (FCh) | START ADDRESS | | | TRACK MODE | 580 |
| | | END ADDRESS | | | LINK INFO. | 581 |
| | (FDh) | START ADDRESS | | | TRACK MODE | 582 |
| | | END ADDRESS | | | LINK INFO. | 583 |
| | (FEh) | START ADDRESS | | | TRACK MODE | 584 |
| | | END ADDRESS | | | LINK INFO. | 585 |
| | (FFh) | START ADDRESS | | | TRACK MODE | 586 |
| | | END ADDRESS | | | LINK INFO. | 587 |

Fig. 20A

CORRELATION TABLE DESIGNATION DATA PORTION

| P-DFA: — | P-EMPTY: 04h | P-FRA: 03h |
|---|---|---|
| P-TNO1: 01h | P-TNO2: 02h | P-TNO3: — |
| P-TNO4: — | P-TNO5: — | P-TNO6: — |
| | | |
| P-TNO253: — | P-TNO254: — | P-TNO255: — |

Fig. 20B

MANAGEMENT TABLE PORTION (255 PART TABLES)

| | START ADDRESS | END ADDRESS | TRACK MODE | LINK INFORMATION | |
|---|---|---|---|---|---|
| (01h) | a0 | a4 | | — | (N) |
| (02h) | a5 | a6 | | — | (N+1) |
| (03h) | a7 | a8 | | — | (F1) |
| (04h) | — | — | | 05h | |
| (05h) | — | — | | 06h | |
| (06h) | — | — | | 07h | |
| (07h) | — | — | | 08h | |
| | | | | | |
| (FEh) | — | — | | FFh | |
| (FF) | — | — | | — | |

Fig. 22A

CORRELATION TABLE DESIGNATION DATA PORTION

| P-DFA : | — | P-EMPTY : | 05h | P-FRA : | 03h |
|---|---|---|---|---|---|
| P-TNO1 : | 01h | P-TNO2 : | 04h | P-TNO3 : | 02h |
| P-TNO4 : | — | P-TNO5 : | — | P-TNO6 : | — |
| P-TNO253 : | — | P-TNO254 : | — | P-TNO255 : | — |

Fig. 22B

MANAGEMENT TABLE PORTION (255 PART TABLES)

| | START ADDRESS | END ADDRESS | TRACK MODE | LINK INFORMATION | |
|---|---|---|---|---|---|
| (01h) | a0 | a2 | | — | (N) |
| (02h) | a5 | a6 | | — | (N+1) |
| (03h) | a7 | a8 | | — | (F1) |
| (04h) | a3 | a4 | | — | |
| (05h) | — | — | | 06h | |
| (06h) | — | — | | 07h | |
| (07h) | — | — | | 08h | |
| (FEh) | — | — | | FFh | |
| (FF) | — | — | | — | |

CORRELATION TABLE DESIGNATION DATA PORTION

| P-DFA : | — | P-EMPTY : | 05h | P-FRA : | 03h |
|---|---|---|---|---|---|
| P-TNO1 : | 01h | P-TNO2 : | 02h | P-TNO3 : | — |
| P-TNO4 : | — | P-TNO5 : | — | P-TNO6 : | — |
| P-TNO253 : | — | P-TNO254 : | — | P-TNO255 : | — |

MANAGEMENT TABLE PORTION (255 PART TABLES)

| | START ADDRESS | END ADDRESS | TRACK MODE | LINK INFORMATION | |
|---|---|---|---|---|---|
| (01h) | a0 | a2 | | — | (N) |
| (02h) | a5 | a6 | | — | (N+1) |
| (03h) | a7 | a8 | | 04h | (F1) |
| (04h) | a3 | a4 | | — | |
| (05h) | — | — | | 06h | |
| (06h) | — | — | | 07h | |
| (07h) | — | — | | 08h | |
| (FEh) | — | — | | FFh | |
| (FF) | — | — | | — | |

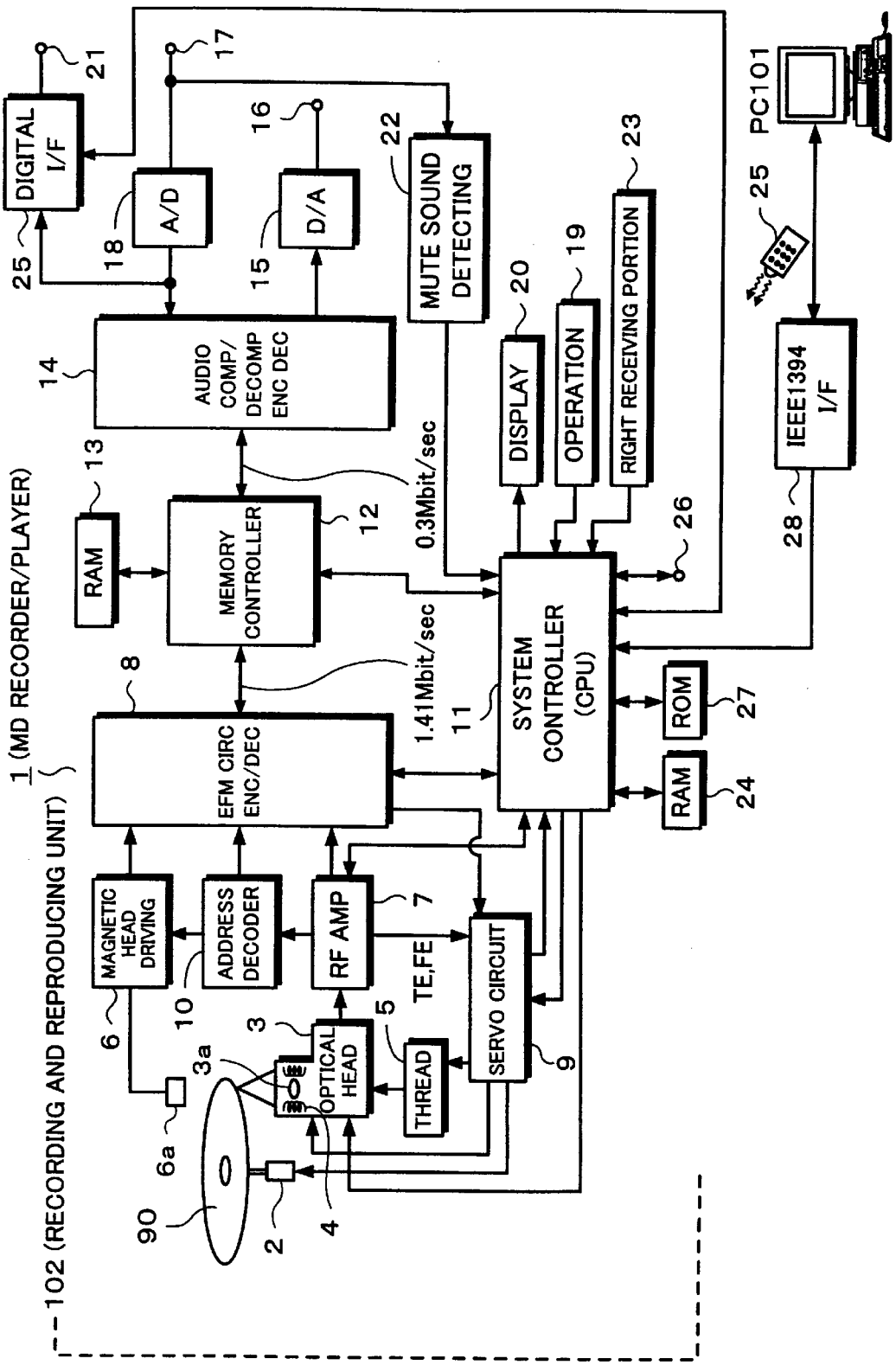

EDITING APPARATUS AND EDITING METHOD

BACKGROUND OF THE INVENTION

1. Field of the Invention

The present invention relates to an editing apparatus and an editing method for editing for example audio data recorded on a record medium.

2. Description of the Related Art

As a related art reference of a highly efficiently encoding method for an audio signal, for example, a transform encoding method is known. The transform encoding method is one example of a block-segmentation frequency band dividing method. In the transform encoding method, a time-base audio signal is segmented into blocks at intervals of a predetermined unit time period. The time-base signal of each block is converted into a frequency-base signal (namely, orthogonally transformed). Thus, the time-base signal is divided into a plurality of frequency bands. In each frequency band, blocks are encoded. As another related art reference, a sub band coding (SBC) method as an example of a non-block-segmentation frequency band dividing method is known. In the SBC method, a time-base audio signal is divided into a plurality of frequency bands and then encoded without segmenting the signal into blocks at intervals of a predetermined unit time period.

As another related art reference, a highly efficiently encoding method that is a combination of the band division encoding method and the SBC method is also known. In this highly efficiently encoding method, a signal of each sub band is orthogonally transformed into a frequency-base signal corresponding to the transform encoding method. The transformed signal is encoded in each sub band.

As an example of a band dividing filter used for the above-described sub band coding method, for example a QMF (Quadrature Mirror Filter) is known. The QMF is described in for example R. E. Crochiere "Digital coding of speech in sub bands" Bell Syst. Tech. J. Vol. 55. No. 8 (1976). An equal band width filter dividing method for a poly-phase quadrature filter and an apparatus thereof are described in ICASSP 83, BOSTON "Polyphase Quadrature filters—A new sub band coding technique", Joseph H. Rothwiler.

As an example of the orthogonal transform method, an input audio signal is segmented into blocks at intervals of a predetermined unit time period (for each frame). Each block is transformed by for example a fast Fourier transforming (FFT) method, a discrete cosine transforming (DCT) method, or a modified DCT transforming (MDCT) method. As a result, a time-base signal is converted into a frequency-base signal. The MDCT is described in for example ICASSP 1987, "Sub band/Transform coding Using Filter Bank Designs Based on Time Domain Aliasing Cancellation", J. P. Princen and A. B. Bradley, Univ. of Surrey Royal Melbourne Inst. of Tech.

On the other hand, an encoding method that uses a frequency division width in consideration of the hearing characteristics of humans for quantizing each sub band frequency component is known. In other words, so-called critical bands of which their band widths are proportional to their frequencies have been widely used. With the critical bands, an audio signal may be divided into a plurality of sub bands (for example, 25 sub bands). According to such a sub band coding method, when data of each sub band is encoded, a predetermined number of bits is allocated for each sub band. Alternatively, an adaptive number of bits is allocated for each sub band. For example, when MDCT coefficient data generated by the MDCT process is encoded with the above-described bit allocating method, an adaptive number of bits is allocated to the MDCT coefficient data of each block of each sub band. With the allocated bits, each block is encoded.

An example of a related art reference of such a bit allocating method and an apparatus corresponding thereto is described as "a method for allocating bits corresponding to the strength of a signal of each sub band" in IEEE Transactions of Acoustics, Speech, and Signal Processing, vol. ASSP-25, NO. 4, August (1977). As another related art reference, "a method for fixedly allocating bits corresponding to a signal to noise ratio for each sub band using a masking of the sense of hearing" is described in ICASP, 1980, "The critical band coder—digital encoding of the perceptual requirements of the auditory system", M. A. Kransner MIT.

When each block is encoded for each sub band, each block is normalized and quantized for each sub band. Thus, each block is effectively encoded. This process is referred to as block floating process. When MDCT coefficient data generated by the MDCT process is encoded, the maximum value of the absolute values of the MDCT coefficients is obtained for each sub band. Corresponding to the maximum value, the MDCT coefficient data is normalized and then quantized. Thus, the MDCT coefficient data can be more effectively encoded. The normalizing process can be performed as follows. From a plurality of numbered values, a value used for the normalizing process is selected for each block using a predetermined calculating process. The number assigned to the selected value is used as normalization information. The plurality of values are numbered so that they increment by 2 dB of an audio level.

The above-described highly effectively encoded signal is decoded as follows. With reference to the bit allocation information, the normalization information, and so forth for each sub band, MDCT coefficient data is generated corresponding to a signal that has been highly efficiently encoded. Since a so-called inversely orthogonally transforming process is performed corresponding to the MDCT coefficient data, time-base data is generated. When the highly efficiently encoding process is performed, if the frequency band is divided into sub bands by a band dividing filter, the time-base data is combined using a sub band combining filter.

When numbered normalization information is changed by an adding process, a subtracting process, or the like, a reproduction level adjusting function, a filtering function, and so forth can be accomplished for a time-base signal of which a highly efficiently encoded data has been decoded. According to this method, since the reproduction level can be adjusted by a calculating process such as an adding process or a subtracting process, the structure of the apparatus becomes simple. In addition, since a decoding process, an encoding process, and so forth are not excessively required, the reproduction level can be adjusted without a deterioration of the signal quality. In addition, in this method, even if a highly efficiently encoded signal is changed, since the time period of the decoded signal does not vary, when numbered normalization information is changed, part of the signal generated by the decoding process can be changed. As a result of a partial change of such a signal, for example, a fade-in process and a fade-out process can be performed for a music program recorded on a disc. In this case, in the fade-in process, the fade-out process, and so forth, parameters of transition time, transition shape, transition start position, and transition end position can be designated. Thus, the fade shape can be more accurately formed.

As a record medium on which a signal that has been highly efficiently encoded is recorded, an MD (mini disc) that is a magneto-optical disc is known. In addition, an MD system that records and/or reproduces data such as audio data using an MD as a record medium is known. By adding a structure that performs a process for reflecting a changed result of numbered normalization information to recorded data to such an MD system, an editing function can be accomplished.

In the record format of an MD, besides a main data record area such as audio data, a management information area for recording information that represents a recorded area and a non-recorded area for data is formed. The management information area is referred to as U-TOC (User-Table Of Contents). When data is recorded on an MD, a non-recorded area is detected with reference to U-TOC. When data is reproduced from an MD, a area in which desired data has been recorded is detected with reference to U-TOC.

In U-TOC, the area in which recorded data such as audio data has been written is managed for each music program as a unit referred to as track. In other words, the start address, the end address, and so forth of each track are recorded. When the-contents of U-TOC are updated, recorded data can be edited. As examples of such an editing process, a dividing process for dividing one track into a plurality of tracks, a combining process for combining a plurality of tracks to one track, a moving process for changing track numbers of tracks in the reproducing order of a normal reproducing operation rather than a shuffle-reproducing operation, and an erasing process for erasing an unnecessary track can be easily and quickly performed.

However, when an editing process such as a fade-in process, a fade-out process, or the like is performed by changing normalization information of highly efficiently encoded information, the user may want to change the remaining data. For example, when the end address of a track of which the fade-out process has been performed does not match the last transition positon of the fade-out process, if the region between the end address and the last position is treated as a new track, it may be detected as an unnecessary region. In such an editing process, by updating the contents of U-TOC, the region can be divided or erased.

In particular, after performing an editing process such as a fade-out process, he or she may want to perform a dividing process, an erasing process, or the like. Such an operation can be accomplished in such a manner that while checking the last transition position of the fade-out process with a rehearsal reproducing operation (namely, a trial reproducing operation), the user designates a dividing position, an erasing position, or the like. However, such an operation is very troublesome for the user. In addition, when the user designates an edit position for only an audio output as a rehearsal reproduction output, it is difficult to accurately designate the last transition position of the fade-out.

In addition, there is a case that an editing process for substituting a data region for the fade-out process with zero data or almost zero data is desired. Such an editing process cannot be accomplished by only a process for updating the contents of U-TOC. Such a problem mainly takes place in the fade-out process. However, it may take place in the fade-in process or the like.

OBJECTS AND SUMMARY OF THE INVENTION

Therefore, an object of the present invention is to provide an editing apparatus and an editing method that allow a desired second editing process in association with a first editing process for changing normalization information or the like to be easily and accurately performed.

A first aspect of the present invention is an editing apparatus for editing a highly efficient encoded digital signal recorded on a record medium having a program area for recording programs and a management area for recording management information, each of the programs being composed of a digital signal containing at least normalization information that has been highly efficiently encoded corresponding to normalization information, quantization coefficients, and quantization data calculated for each of a plurality of signal components divided in time-base direction and/or frequency-base direction, the management information being used to manage at least a record start position and a record end position of each of the programs recorded on the program area, comprising an operating means for designating an edit start position and an edit end position to vicinities of end portions of a predetermined program recorded in the program area of the record medium, a reproducing means for reproducing a digital signal between the edit start position and the edit end position corresponding to the vicinities of the end portions of the predetermined program recorded in the program area of the record medium, a changing means for changing normalization information contained in the digital signal reproduced by the reproducing means, a recording means for substituting the normalization information changed by the changing means with the normalization information contained in the digital signal reproduced by the reproducing means and re-recording the substituted normalization information to the record medium to the vicinities of the end portions of the predetermined program recorded in the program area of the record medium corresponding to the edit start position and the edit end position, and a management information editing means for editing the management information recorded in the management area of the record medium against the vicinities of the end portions of the predetermined program recorded in the program area of the record medium corresponding to the edit start position and the edit end position.

A second aspect of the present invention is an editing method for editing a highly efficient encoded digital signal recorded on a record medium having a program area for recording programs and a management area for recording management information, each of the programs being composed of a digital signal containing at least normalization information that has been highly efficiently encoded corresponding to normalization information, quantization coefficients, and quantization data calculated for each of a plurality of signal components divided in time-base direction and/or frequency-base direction, the management information being used to manage at least a record start position and a record end position of each of the programs recorded on the program area, comprising the steps of reproducing a digital signal between the edit start position and the edit end position corresponding to the vicinities of the end portions of the predetermined program recorded in the program area of the record medium, changing normalization information contained in the digital signal reproduced at the reproducing step, substituting the normalization information changed at the changing step with the normalization information contained in the digital signal reproduced at the reproducing step and re-recording the substituted normalization information to the record medium to the vicinities of the end portions of the predetermined program recorded in the program area of the record medium corresponding to the edit start position and the edit end position, and editing the management information recorded in the management area of the record medium against the vicinities of the end portions of the predetermined program recorded in the program area of the record medium corresponding to the edit start position and the edit end position.

A third aspect of the present invention is an editing apparatus for editing a highly efficient encoded digital signal recorded on a record medium having a program area for recording programs and a management area for recording management information, each of the programs being composed of a digital signal containing at least normalization information that has been highly efficiently encoded corresponding to normalization information, quantization coefficients, and quantization data calculated for each of a plurality of signal components divided in time-base direction and/or frequency-base direction, the management information being used to manage at least a record position of each of the programs recorded on the program area, comprising an operating means for selecting a program to be edited and an edit region, a reproducing means for reproducing a digital signal including at least normalization information corresponding to the edit region selected by the operating means and management information from a management area of the record medium, a first storing means for storing the management information for managing at least record positions of individual programs, the management information being reproduced from the management area of the record medium, a second storing means for storing a digital signal including at least normalization information reproduced by the reproducing means, a rewriting means for rewriting normalization information in a digital signal including at least normalization information stored in the second storing means, a controlling means for overwriting a digital signal including normalization information rewritten by the rewriting means to the record medium corresponding to management information stored in the first storing means, a comparing means for comparing the record position of a program to be edited, the record position being stored in the first storing means with an edit region selected by the operating means, and a selecting means for detecting a remaining area as an edited result corresponding to the compared result of the comparing means and for selecting a process type for the detected remaining area.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 3 is a schematic diagram showing the data structure of encoded unit block data;

FIG. 4 is a schematic diagram showing the data structure of number of unit blocks and dually written data contained in unit block data shown in FIG. 3;

FIG. 17A is a schematic diagram showing the structure of data recorded in the unit of clusters on the disc;

FIG. 17B is a schematic diagram showing the structure of a sector group composing a cluster;

FIG. 19 is a schematic diagram showing the data structure sector 0 of U-TOC as management information;

FIG. 20A is a schematic diagram showing the data structure of a correlation table designation data portion in the initial state before the fade-out process is performed;

FIG. 20B is a schematic diagram showing the data structure of a management table portion in the initial state before the fade-out process is performed;

FIG. 22A is a schematic diagram showing the data structure of the correlation table designation data portion in the case that outer data is divided after the fade-out process has been performed;

FIG. 22B is a schematic diagram showing the data structure of a management table portion in the case that outer data is divided after the fade-out process has been performed;

FIG. 28 is a block diagram showing the structure of a recording and reproducing apparatus according to the present invention.

DETAILED DESCRIPTION OF THE PREFERRED EMBODIMENT

Figure 1:
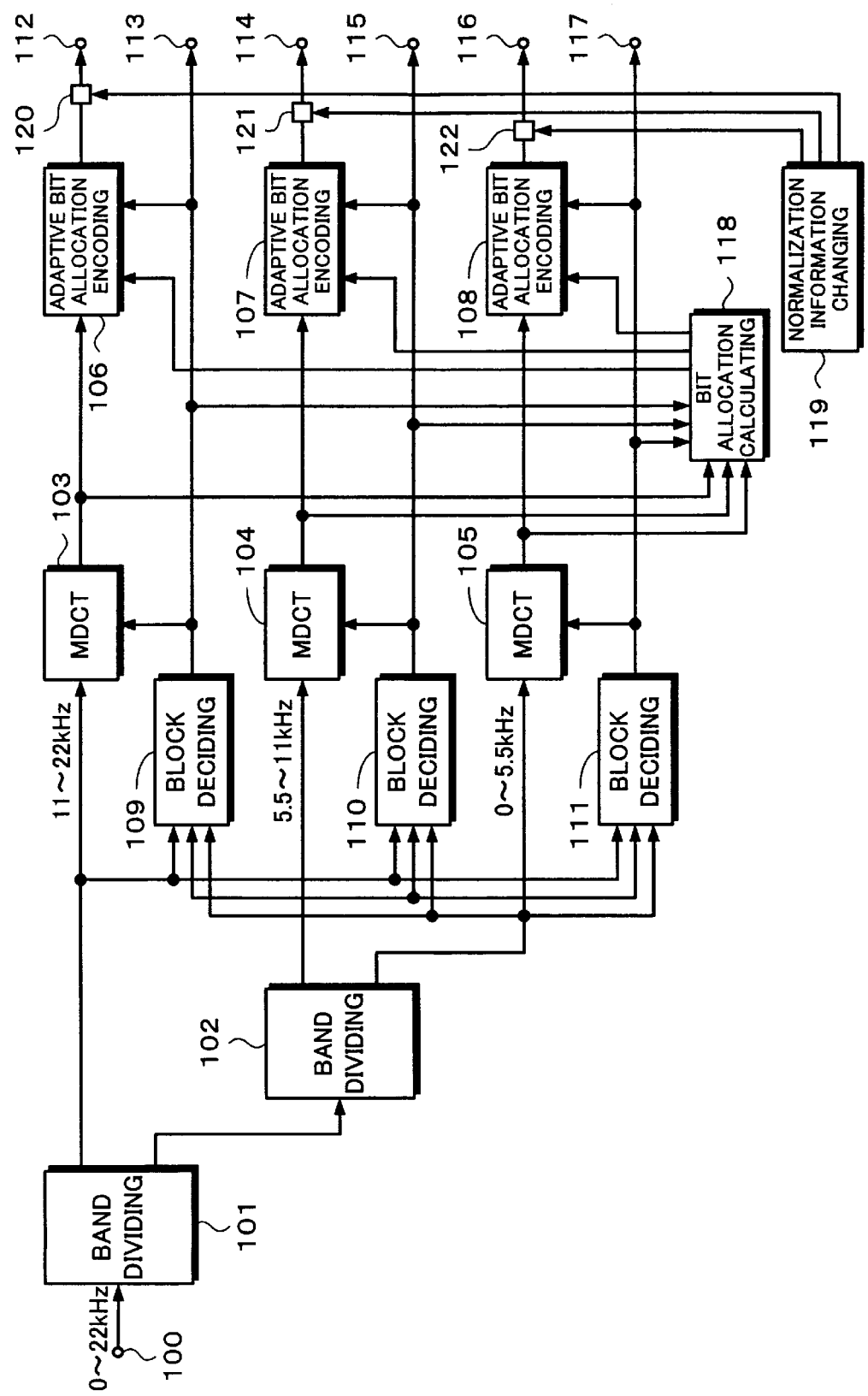
FIG. 1 is a block diagram showing an encoding circuit that performs a highly efficiently encoding process according to the present invention.

Before describing an embodiment of the present invention, a highly efficient encoding process used for generating recorded data according to an embodiment of the present invention will be described. FIG. 1 shows an example of the structure of an encode-processing system that performs such a highly efficient encoding process. In this example, with a sub band coding (SBC) process, an adaptive transform coding (ATC) process, an adaptive bit allocating process, an input digital signal such as an audio PCM signal is encoded corresponding to a highly efficiently encoding process. When the sampling frequency is 44.1 kHz, an audio PCM signal with a frequency band of 0 to 22 kHz is supplied to a band dividing filter 101 through an input terminal 100. The band dividing filter 101 divides the supplied signal into a signal with a sub band of 0 to 11 kHz and a signal with a sub band of 11 kHz to 22 kHz. The signal with the sub band of 11 to 22 kHz is supplied to an MDCT (Modified Discrete Cosine Transform) circuit 103 and block designating circuits 109, 110, and 111.

The signal with the sub band of 0 kHz to 11 kHz is supplied to a band dividing filter 102. The band dividing filter 102 divides the supplied signal into a signal with a sub band of 5.5 kHz to 11 kHz and a signal with a sub band of 0 to 5.5 kHz. The signal with the sub band of 5.5 to 11 kHz is supplied to an MDCT circuit 104 and the block designating circuits 109, 110, and 111. On the other hand, the signal with the sub band of 0 to 5.5 kHz is supplied to an MDCT circuit 105 and the block designating circuits 109, 110, and 111. Each of the band dividing filters 101 and 102 can be composed of a QFM filter or the like. The block designating circuit 109 designates the block size corresponding to the supplied signal. Information that represents the designated block size is supplied to the MDCT circuit 103, an adaptive bit allocation encoding circuit 106, and an output terminal 113.

The block designating circuit 110 designates the block size corresponding to the supplied signal. Information that represents the designated block size is supplied to the MDCT circuit 104, and an output terminal 115. The block designating circuit 111 designates the block size corresponding to the supplied signal. Information that represents the designated block size is supplied to the MDCT circuit 105, and an output terminal 117. The block designating circuits 109, 110, and 111 cause the block size to be adaptively changed corresponding to the input data before the orthogonally transforming process is performed.

FIG. 2 shows examples of data of individual sub bands supplied to the MDCT circuits 103, 104, and 105. The block designating circuits 109, 110, and 111 independently designate the sizes of orthogonally transformed blocks of individual sub bands that are output from the band dividing filters 101 and 102. In addition, the MDCT circuits 103, 104, and 105 can change time resolutions corresponding to time characteristics and frequency distributions of the signals. When the input signal is chronologically semi-steady, as shown in FIG. 2, a long mode of which the size of each orthogonally transformed block is for example 11.6 ms is used.

Figure 2B:
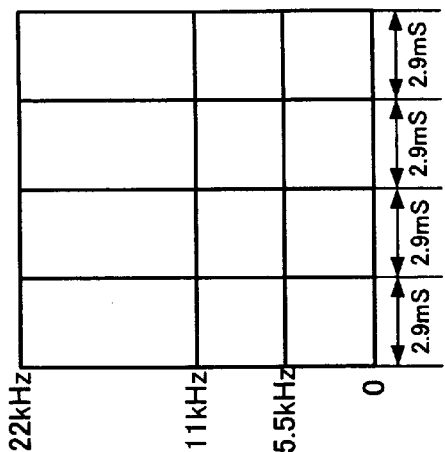
FIG. 2B is a graph showing an orthogonally transformed block size in a short mode.
Figure 2D:
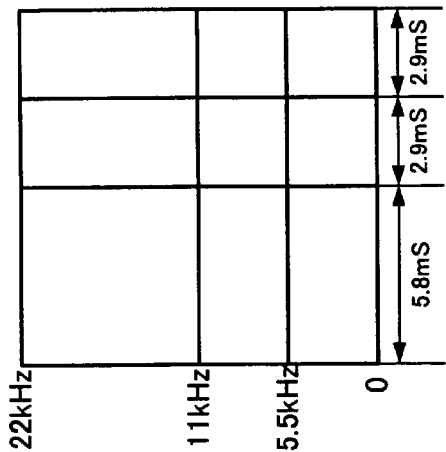
FIG. 2D is a graph showing an orthogonally transformed block size in a middle mode—B.
Figure 2A:
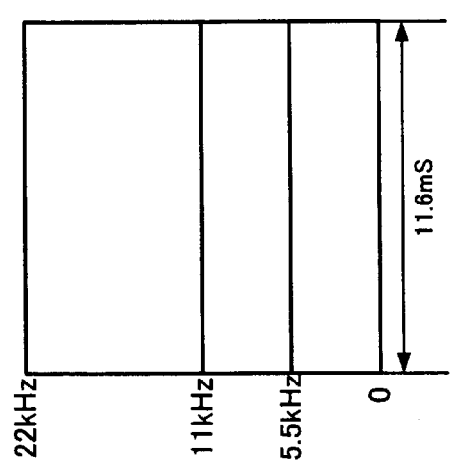
FIG. 2A is a graph showing an orthogonally transformed block size in a long mode.
Figure 2C:
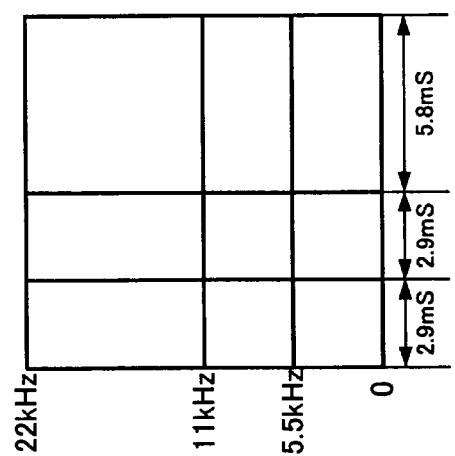
FIG. 2C is a graph showing an orthogonally transformed block size in a middle mode—A.

On the other hand, when the input signal is non-steady, one of modes of which the size of each orthogonally transformed block is ½ or ¼ of the size of each orthogonally transformed block of the long mode is used. In reality, in a short mode, the size of each orthogonally transformed block is ¼ of the size of each orthogonally transformed block of the long mode. Thus, in the short mode, the size of each orthogonally transformed block is 2.9 ms as shown in FIG. 2B. There are two middle modes that are a middle mode a and a middle mode b. In the middle mode a, the size of one orthogonally transformed block is ½ of the size of each orthogonally transformed block of the long mode and the size of another orthogonally transformed block is ¼ of the size of each orthogonally transformed block of the long mode. Thus, in the middle mode a, the size of one orthogonally transformed block is 5.8 ms and the size of another orthogonally transformed block is 2.9 ms as shown in FIG. 2C. In the middle mode b, the size of one orthogonally transformed block is ¼ of the size of each orthogonally transformed block of the long mode and the size of another orthogonally transformed block is ½ of the size of each orthogonally transformed block of the long block. Thus, in the middle mode b, the size of one orthogonally transformed block is 2.9 ms and the size of another orthogonally transformed block is 5.8 ms as shown in FIG. 2D. With such various time resolutions, complicated input signals can be handled.

When the circuit scale of the apparatus is not restricted, size of each orthogonally transformed block can be divided in more complicated manners. Thus, it is clear that real input signals can be more adequately processed. The block size is designated by the block designating circuits 109, 110, and 111. Information that represents the designated block size is supplied to the MDCT circuits 103, 104, and 105, a bit allocation calculating circuit 118, and the output terminals 113, 115, and 117.

Returning to FIG. 1, the MDCT circuit 103 performs the MDCT process corresponding to the block size designated by the block designating circuit 109. High band MDCT coefficient data or frequency-base spectrum data that is generated by such a process is combined for each critical band and supplied to the adaptive bit allocation encoding circuit 106 and the bit allocation calculating circuit 118. The MDCT circuit 104 performs the MDCT process corresponding to the block size designated by the block designating circuit 110. Middle band MDCT coefficient data or frequency-base spectrum data generated by such a process is supplied to the adaptive bit allocation encoding circuit 107 and the bit allocation calculating circuit 118 after the critical band width thereof is divided in consideration of the effectiveness of the block floating process.

The MDCT circuit 105 performs the MDCT process corresponding to the block size designated by the block designating circuit 111. As the result of the process, low band MDCT coefficient data or frequency-base spectrum data is combined for each critical band and then supplied to the adaptive bit allocation encoding circuit 108 and the bit allocation calculating circuit 118. The critical bands are frequency bands that are divided in consideration of the hearing characteristics of humans. When a particular pure sound is masked with a narrow band noise that has the same strength thereof and that is in the vicinity of the frequency band of the pure sound, the band of the narrow band noise is a critical band. The band widths of the critical bands are proportional to their frequencies. The frequency band of 0 to 22 kHz is divided into for example 25 critical bands.

The bit allocation calculating circuit 118 calculates for example the masking amount, energy, and/or peak value for each sub band in consideration of the above-described critical bands and block floating for a masking effect (that will be described later) corresponding to the supplied MDCT coefficient data or frequency-base spectrum data and block size information. Corresponding to the calculated results, the bit allocation calculating circuit 118 calculates the scale factor and the number of allocated bits for each sub band. The calculated number of allocated bits is supplied to the adaptive bit allocation encoding circuits 106, 107, and 108. In the following description, each sub band as a bit allocation unit is referred to as unit block.

The adaptive bit allocation encoding circuit 106 re-quantizes the spectrum data or MDGT coefficient data supplied from the MDCT circuit 103 corresponding to the block size information supplied from the block designating circuit 109 and to the number of allocated bits and the scale factor information supplied from the bit allocation calculating circuit 118. As the result of the process, the adaptive bit allocation encoding circuit 106 generates encoded data corresponding to the applied encoding format. The encoded data is supplied to a calculating device 120. The adaptive bit allocation encoding circuit 107 re-quantizes the spectrum data or MDCT coefficient data supplied from the MDCT circuit 104 corresponding to the block size information supplied from the block designating circuit 110 and to the number of allocated bits and scale factor information supplied from the bit allocation calculating circuit 118. As the result of the process, encoded data corresponding to the applied encoding format is generated. The encoded data is supplied to a calculating device 121.

The adaptive bit allocation encoding circuit 108 re-quantizes the spectrum data or MDCT coefficient data supplied from the MDCT circuit 105 corresponding to the block size information supplied from the block designating circuit 110 and to the number of allocated bits and scale factor information supplied from the bit allocation calculating circuit 118. As the result of the process, encoded data corresponding to the applied encoding format is generated. The encoded data is supplied to a calculating device 122.

FIG. 3 shows an example of the format of encoded data. In FIG. 3, numeric values 0, 1, 2, . . . , 211 on the left side represent bytes. In this example, one frame is composed of 212 bytes. At the 0-th byte position, block size information of each sub band designated by the block designating circuits 109, 110, and 111 shown in FIG. 1 is placed. At the first byte position, information that represents the number of unit blocks is placed. In the high band, the probability of which no bits are allocated to unit blocks by the bit allocation calculating circuit 118 and thereby they are not recorded becomes high. Thus, to deal with such a situation, the number of unit blocks is designated in such a manner that more bits are allocated to the middle band region and the low band region that largely affect the sense of hearing than the high band region. In addition, at the first byte position, the number of unit blocks in which bit allocation information is dually written and the number of unit blocks in which scale factor information is dually written are placed.

To correct an error, the same information is dually written. In other words, data recorded at a particular byte is dually recorded to another byte. Although the strength against an error is proportional to the amount of data that is dually written, the amount of data used for spectrum data decreases. In the example of the encoding format, since the number of unit blocks in which bit allocation information is dually written and the number of unit blocks in which scale factor information is dually written are independently designated, the strength against an error and the number of bits used for spectrum data can be optimized. The relation between a code in a predetermined bit and the number of unit blocks has been defined as a format.

FIG. 4 shows an example of contents of eight bits of the first byte. In this example, the first three bits represent the number of contained unit blocks. The next two bits represent the number of unit blocks to which the bit allocation information is dually written. The last three bits represent the number of unit blocks unit blocks to which the scale factor information is dually written.

At the second byte position shown in FIG. 3, the bit allocation information of each unit block is placed. One unit block is composed of for example four bites. Thus, the bit allocation information for the number of unit blocks starting with 0-th unit block is placed. The bit allocation information is followed by scale factor information of each unit block. For the scale factor information, each unit block is composed of for example six bits. Thus, the scale factor information for the number of unit blocks starting with the 0-th unit block is placed.

The scale factor information is followed by spectrum data of each unit block. The spectrum data for the number of unit blocks that are really contained is placed. Since the data amount of spectrum data contained in each unit block has been defined as a format, with the bit allocation information, the relation of data can be obtained. When the number of bits allocated to a particular unit block is zero, the unit block is not contained.

The spectrum information is followed by the scale factor that is dually written and the bit allocation information that is dually written. The scale factor information and the bit allocation information are dually written corresponding to the dual write information shown in FIG. 4. At the last byte. (211-st byte) and the second last byte (210-th byte), information at the 0-th byte and information at the first byte are dually written. The two bytes in which such information is dually written has been defined as a format. However, scale factor information that is dually written and the bit allocation information that is dually written cannot be changed.

One frame contains 1024 PCM samples that are supplied through the input terminal 100. The first 512 samples are used in the immediately preceding frame. The last 512 samples are used in the immediately following frame. This arrangement is used from a view point of an overlap of the MDCT process.

Returning to FIG. 1, a normalization information changing circuit 119 generates values for changing scale factor information for a low band, a middle band, and a high band and supplies the values corresponding to the low band, the middle band, and the high band to the calculating devices 120, 121, and 122, respectively. The calculating device 120 adds the value supplied from the normalization information changing circuit 119 to the scale factor information contained in the encoded data supplied from the adaptive bit allocation encoding circuit 106. When the value that is output from the normalization information changing circuit 119 is negative, the calculating device 120 operates as a subtracting device. The calculating device 121 adds the value supplied from the normalization information changing circuit 119 to the scale factor information contained in the encoded data supplied from the adaptive bit allocation encoding circuit 107. When the value that is output from the normalization information changing circuit 119 is negative, the calculating device 121 operates as a subtracting device.

The calculating device 122 adds the value supplied from the normalization information changing circuit 119 to the scale factor information contained in the encoded data supplied from the adaptive bit allocation encoding circuit 108. When the value that is output from the normalization information changing circuit 119 is negative, the calculating device 122 operates as a subtracting device. The calculating devices 120, 121, and 122 output the values to output terminals 112, 114, and 116, respectively. The normalization information changing circuit 119 operates corresponding to an operation of the user through for example an operation panel. In this case, the level adjusting process, the filtering process, (these are described later) and so forth that the user desires are accomplished.

Figure 5:
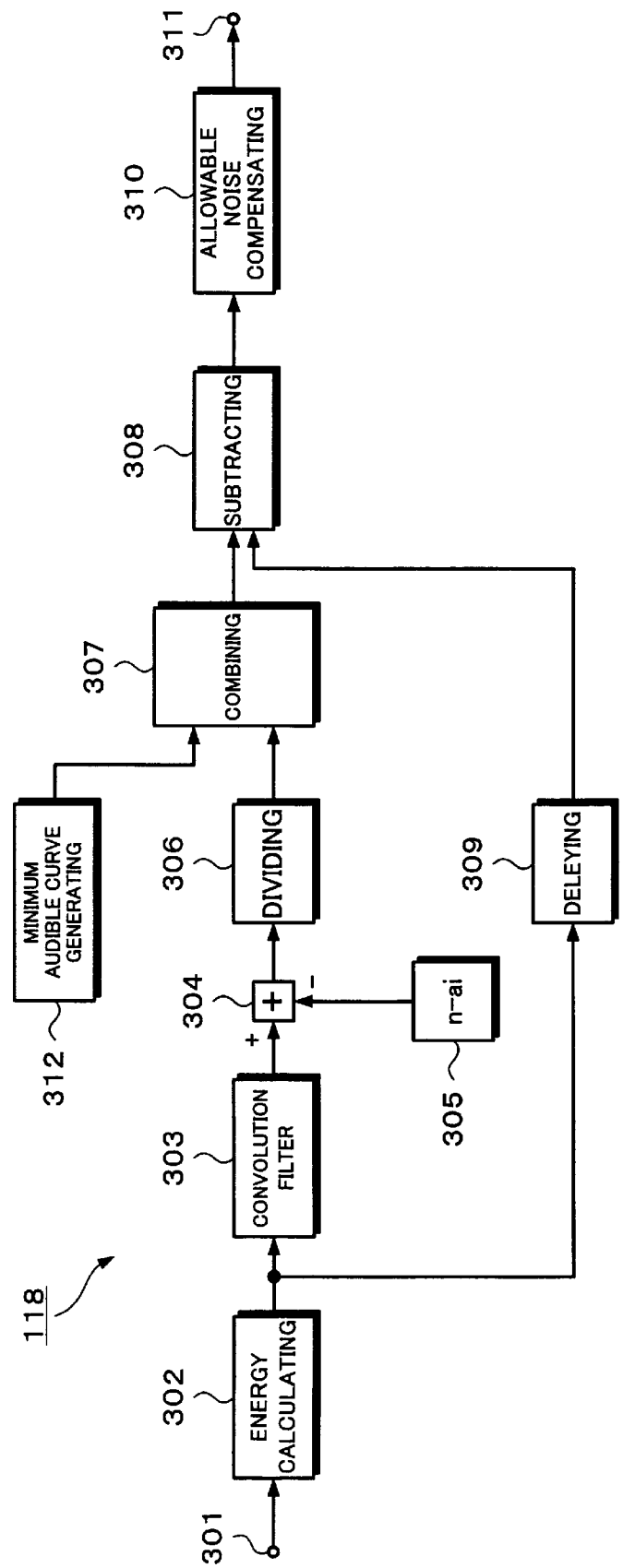
FIG. 5 is a block diagram showing the structure of a bit allocation calculating circuit shown in FIG. 1.

Next, each process will be described in detail. FIG. 5 shows an example of the structure of the bit allocation calculating circuit 118. Frequency-base spectrum data or MDCT coefficients supplied from the MDCT circuits 103, 104, and 105 through an input terminal 301 is supplied to an energy calculating circuit 302. In addition, block size information is supplied from the block designating circuits 109, 110, and 111 through the input terminal 301 to the energy calculating circuit 302. The energy calculating circuit 302 calculates the sum of the amplitude values of each unit block so as to calculate the energy of each unit block.

Figure 6:
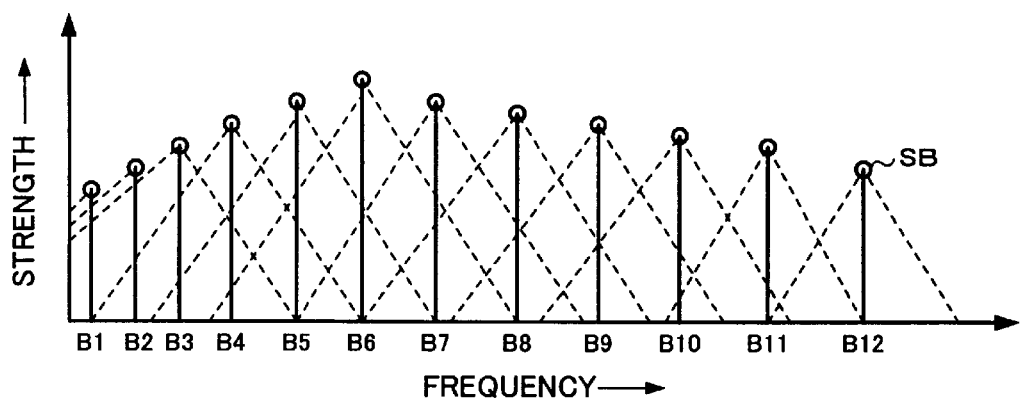
FIG. 6 is a graph showing a frequency characteristic of an output signal of an energy calculating circuit shown in FIG. 5.

FIG. 6 shows an example of an output signal of the energy calculating circuit 302. In FIG. 6, a spectrum SB of the sum of each sub band is represented by a vertical line with a circle. In FIG. 6, the horizontal axis and the vertical axis represent the frequency and signal strength, respectively. For simplicity, in FIG. 6, only a spectrum B12 is denoted by "SB". The number of sub bands (unit blocks) is 12 (B1 to B12). Instead of the energy calculating circuit 302, a structural portion that calculates the peak value, average value, and so forth of amplitude values and performs a bit allocating process corresponding to the peak value, average value, and so forth of the amplitude values may be disposed.

The energy calculating circuit 302 designates a scale factor value. In reality, several positive values are provided as alternatives of a scale factor value. Among them, values that are larger than the maximum value of absolute values of spectrum data or MDCT coefficients of each unit block are selected. The minimum value of the selected values is used as a scale factor value of the unit block. Numbers are allocated to the alternatives of a scale factor value using for example several bits. The allocated numbers are stored in for example ROM (Read Only Memory) (not shown). At this point, the alternatives of a scale factor value increment by for example 2 dB. A number allocated to a scale factor value selected for a particular unit block is defined as scale factor information of the particular unit block.

An output signal (namely, each value of the spectrum SB) of the energy calculating circuit 302 is supplied to a convolution filter circuit 303. The convolution filter circuit 303 performs a convoluting process for multiplying a predetermined weighting function by a spectrum SB and adding them so as to consider the influence of the masking of the spectrum SB. Next, with reference to FIG. 6, the convoluting process will be described in detail. As was described above, FIG. 6 shows an example of a spectrum SB of each block. In the convoluting process of the convolution filter circuit 303, the sum of portions denoted by dotted lines is calculated. The convolution filter circuit 303 can be composed of a plurality of delaying devices, a plurality of multiplying devices, and a sum adding device. Each of the delaying devices successively delays the input data. Each of the multiplying devices multiplies output data of a relevant delaying device by a filter coefficient (weighting function). The sum adding device adds the output data of the multiplying devices.

Returning to FIG. 5, an output signal of the convolution filter circuit 303 is supplied to a calculating device 304. An allowance function (that represents a masking level) is supplied from an (n−ai) function generating circuit 305 to the calculating device 304. The calculating device 304 calculates a level á corresponding to an allowable noise level in an area convoluted by the convolution filter circuit 303 with the allowance function. As will be described later, the level á corresponding to the allowable noise level is an allowable level of each critical band as a result of an inversely convoluting process. The calculated value of the level á is controlled by increasing/decreasing the allowance function.

In other words, when the numbers allocated from the lowest critical band are denoted by i, the level á corresponding to the allowable noise level can be obtained by the following formula (1).

$$á = S - (n - ai) \qquad (1)$$

wherein n and a are constants; a>0; S is the strength of a convoluted spectrum. In formula (1), (n−ai) is an allowance function. In this example, n=38 and a=1 are given.

The level á calculated by the calculating device 304 is supplied to a dividing device 306. The dividing device 306 inversely convolutes the level á. As a result, the dividing device 306 generates a masking spectrum corresponding to the level á. The masking spectrum is an allowable noise spectrum. When the inversely convoluting process is performed, complicated calculations are required. However, according to the first embodiment of the present invention, with the dividing device 306 that is simply structured, the inversely convoluting process is performed. The masking spectrum is supplied to a combining circuit 307. In addition, data that represents a minimum audible curve RC (that will be described later) is supplied from a minimum audible curve generating circuit 312 to the combining circuit 307.

The combining circuit 307 combines the masking spectrum that is output from the dividing device 306 and the data that represents the minimum audible curve RC and generates a masking spectrum. The generated masking spectrum is supplied to a subtracting device 308. The timing of an output signal of the energy calculating circuit 302 (namely, the spectrum SB of each sub band) is adjusted by a delaying circuit 309. The resultant signal is supplied to the subtracting device 308. The subtracting device 308 performs a subtracting process corresponding to the masking spectrum and the spectrum SB.

Figure 7:
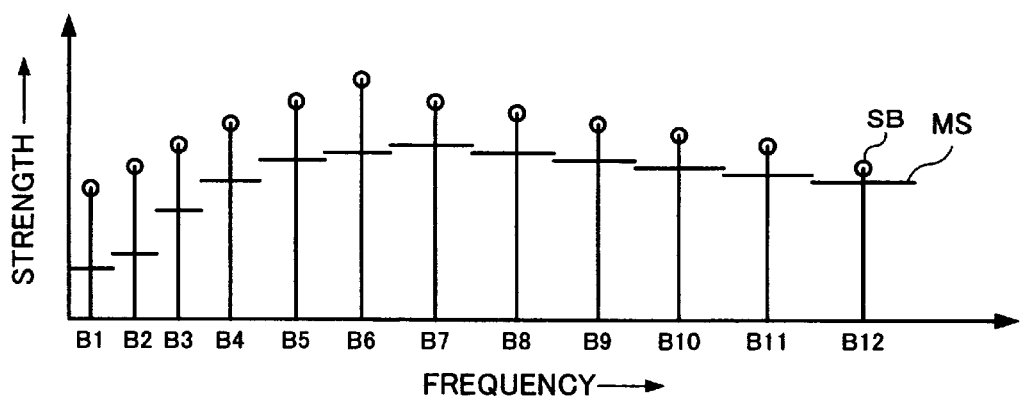
FIG. 7 is a graph showing a frequency characteristic of an output signal of a convolution filter circuit shown in FIG. 5.

As the result of the process, the spectrum SB of each block is masked so that the portion that is smaller than the level of the masking spectrum is masked. FIG. 7 shows an example of the masking process. Referring to FIG. 7, the portion that is smaller than the level of the masking spectrum (denoted by MS) of the spectrum SB is masked. For simplicity, in FIG. 7, only the spectrum B12 is denoted by "SB" and the level of the masking spectrum is denoted by "MS".

When the noise absolute level is equal to or smaller than the minimum audible curve RC, the noise is inaudible for humans. The minimum audible curve varies corresponding to the reproduction volume even in the same encoding method. However, in a real digital system, music data in for example a 16-bit dynamic range does not largely vary. Thus, assuming that the quantizing noise of the most audible frequency band at around 4 kHz is inaudible, it is supposed that the quantizing noise that is smaller than the level of the minimum audible curve is inaudible in other frequency bands.

Figure 8:
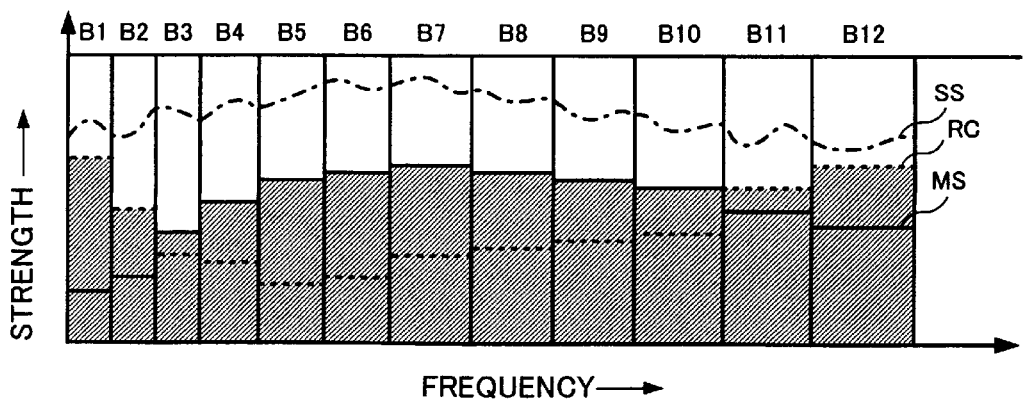
FIG. 8 is a graph showing a frequency characteristic of an output signal of an allowable noise compensating circuit shown in FIG. 5.

Thus, when noise at around 4 kHz of a word length of the system is prevented from being audible, if the allowable noise level is obtained by combining the minimum audible curve RC and the masking spectrum MS, the allowable noise level can be represented as a hatched portion shown in FIG. 8. In this example, the level at 4 kHz of the minimum audible curve is set to the minimum level equivalent to for example 20 bits. In FIG. 8, SB of each block is denoted by a solid line, whereas MS of each block is denoted by a dotted line. However, in FIG. 8, for simplicity, only the spectrum B12 is represented with "SB", and "MS". In FIG. 8, a signal spectrum SS is denoted by a dashed line.

Returning to FIG. 5, an output signal of the subtracting device 308 is supplied to an allowable noise compensating circuit 310. The allowable noise compensating circuit 310 compensates the allowable noise level of the output signal of the subtracting device 308 corresponding to for example data of an equal roundness curve. In other words, the allowable noise compensating circuit 310 calculates allocated bits for each unit block corresponding to various parameters such as the above-described masking and hearing characteristic. An output signal of the allowable noise compensating circuit 310 is obtained as the final output data of the bit allocation calculating circuit 118 through an output terminal 311. In this example, the equal roundness curve is a characteristic curve that represents the hearing characteristic of humans. For example, the sound pressure of a sound at each frequency that is heard with the same strength of a pure sound at 1 kHz is plotted. The potted points are connected and represented as a curve. This curve is referred to as roundness equal sensitivity curve.

The equal roundness curve matches the minimum audible curve shown in FIG. 8. On the equal roundness curve, although the sound pressure at around 4 kHz is smaller than that at 1 kHz by 8 to 10 dB, the strength at 4 kHz is the same as that at 1 kHz. In contrast, unless the sound pressure at 50 Hz is larger than that at 1 kHz by around 15 dB, the strength at 50 Hz is not the same as that at 1 kHz. Thus, when noise that exceeds the level of the minimum audible curve RC (namely, the allowable noise level) has a frequency characteristic corresponding to the equal roundness curve, the noise can be prevented from being audible to humans. Thus, it is clear that in consideration of the equal roundness curve, the allowable noise level can be compensated corresponding to the hearing characteristics of humans.

Next, scale factor information will be described in detail. As alternatives of a scale factor value, a plurality of positive values (for example, 63 positive values) are stored in for example a memory of the bit allocation calculating circuit 118. Values that exceed the maximum value of the absolute values of the spectrum data or MDCT coefficients of a particular unit block are selected from the alternatives. The minimum value of the selected values is used as the scale factor value of the particular unit block. A number allocated to the selected scale factor value is defined as scale factor information of the particular unit block. The scale factor information is contained in the encoded data. The positive values as the alternatives of a scale factor value are allocated with numbers of six bits. The positive values increment by 2 dB.

When the scale factor information is controlled with an adding operation and a subtracting operation, the level of the reproduced audio data can be adjusted with an increment of 2 dB. For example, when the same values that are output from the normalization information changing circuit 119 are added or subtracted to/from the scale factor information of all the unit blocks, the levels of all the unit blocks can be adjusted by 2 dB. The scale factor information generated as the result of the adding/subtracting operations is limited to the range defined in the applied format.

Alternatively, when different values that are output from the normalization information changing circuit 119 are added or subtracted to/from the scale factor information of the respective unit blocks, the levels of the unit blocks can be separately adjusted. As a result, a filtering function can be accomplished. In more reality, when the normalization information changing circuit 119 outputs a pair of a unit block number and a value to be added or subtracted to/from the scale factor information of the unit block, unit blocks and values to be added or subtracted to/from scale factor information of the unit blocks are correlated.

By changing the above-described scale factor information, such functions (that will be described later with reference to FIGS. 10 to 14) can be accomplished. In the first embodiment of the present invention, with the band dividing method using the QMF filter and the encoding method using the MDCT orthogonal transforming process, the above-described functions are accomplished. However, it should be noted that the band dividing method and the encoding method are not limited to the above-described QMF and MDCT, respectively. In other words, as long as a quantizing process is performed with normalization information and bit allocation information, even if a sub band coding process is performed with for example a filter bank, changing process of the scale factor information can be accomplished. The invention relates to an editing process further desired accompanying a changing process of the scale factor.

In the above-described example, the scale factor information was used as normalization information, in other words, information showing a state of block floating unit block. Any other information than scale factor information can be used as normalization information in some encoding method. Even in such a case by changing normalization information, the same function as that of changing process of scale factor information can be accomplished. So the present invention is adaptable.

When a processing system that records a signal to a disc type record medium (for example, a magnetic disc or a magneto optical disc), a tape type record medium (for example, a magnetic tape or an optical tape), or a semiconductor record medium (for example, an IC memory, a memory stick, or a memory card) is disposed downstream of the apparatus according to the first embodiment, a recording apparatus that allows a change of scale factor information to be reflected to record data can be accomplished. When a change of scale factor information is reflected to the record data, a record medium having a reproduction level adjusting function and a fading function can be accomplished.

When a processing system that transmits a signal through a wireless transmission path (for example, radio wave or light (infrared ray)) or a wired transmission path (for example, a wire cable or an optical cable) is disposed downstream of an example of the above described encoding process system, a transmitting apparatus that reflects a change of scale factor information to transmission data can be accomplished.

Figure 9:
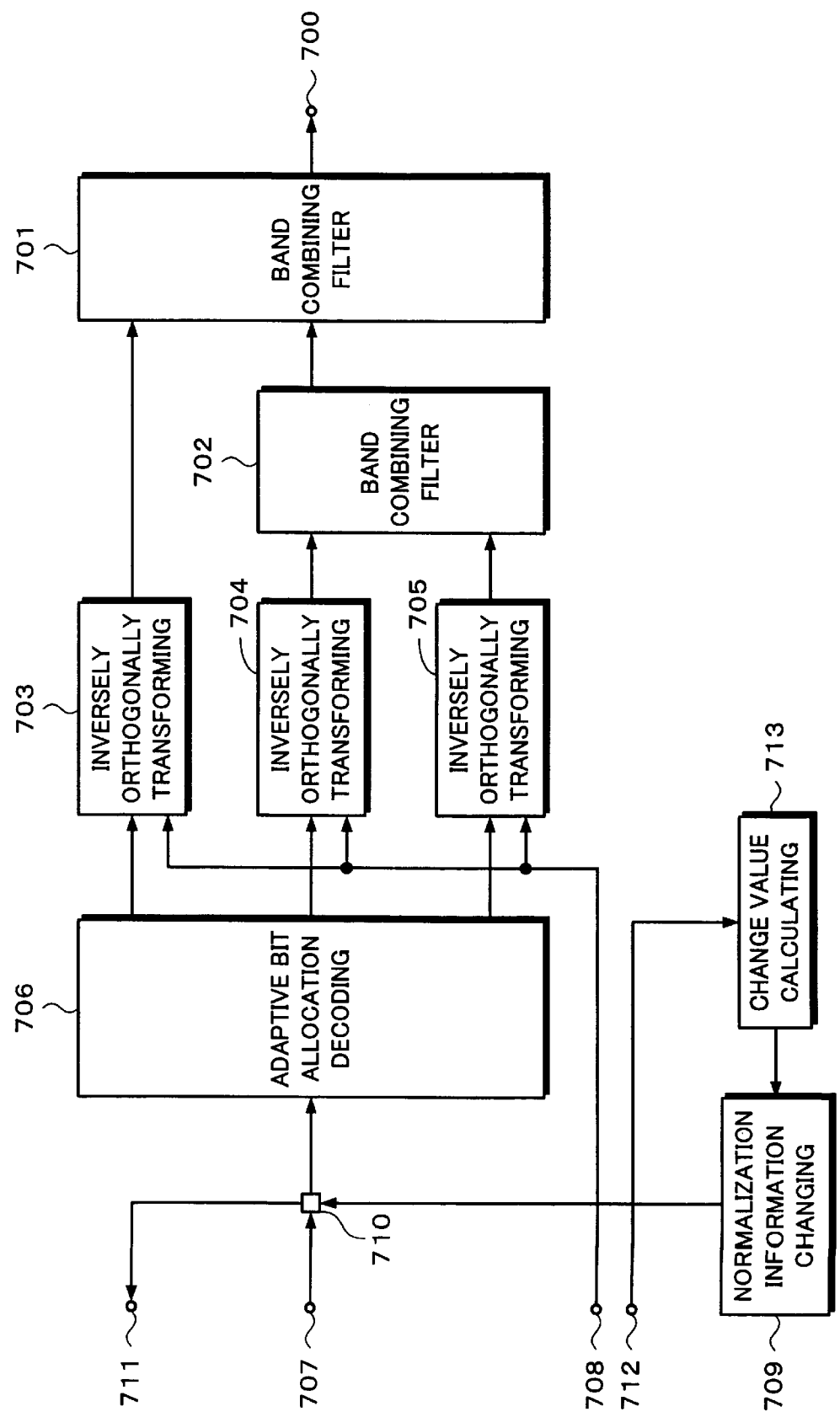
FIG. 9 is a block diagram showing the structure of a decoding circuit that decodes a signal that is encoded by the encoding circuit shown in FIG. 1.

Next, FIG. 9 shows an example of the structure of decoding process system that changes scale factor information when high efficient encoding data is decoded. Encoded data that is reproduced from a record medium such as a MD is supplied to an input terminal 707. Block size information used in the encoding process (namely, data equivalent to output signals of the output terminals 113, 115, and 117 is supplied to an input terminal 708. A time unit of highly efficiently encoded information is supplied to the decoding apparatus through an input terminal 712.

The encoded data is supplied from the input terminal 707 to a calculating device 710. The calculating device 710 also receives numeric data from a normalization information changing circuit 709. The calculating device 710 adds the numeral data supplied from the normalization information changing circuit 119 to the scale factor information contained in the encoded data. When the numeric value that is output from the normalization information changing circuit 119 is a negative value, the calculating device 710 operates as a subtracting device. An output signal of the calculating device 710 is supplied to an adaptive bit allocation decoding circuit 706 and an output terminal 711.

The adaptive bit allocation decoding circuit 706 references the adaptive bit allocation information and deallocates the allocated bits. An output signal of the adaptive bit allocation decoding circuit 706 is supplied to inversely orthogonally transforming circuits 703, 704, and 705. The inversely orthogonally transforming circuits 703, 704, and 705 transform a frequency-base signal into a time-basis signal. An output signal of the inversely orthogonally transforming circuit 703 is supplied to a band combining filter 701. Output signals of the inversely orthogonally transforming circuit 704 and 705 are supplied to a band combining filter 702. Each of the inversely orthogonally transforming circuits 703, 704, and 705 may be composed of an inversely modified DCT transforming circuit (IMDCT).

The band combining filter 702 combines supplied signals and supplies the combined result to the band combining filter 701. The band combining filter 701 combines supplied signals and supplies the combined result to a terminal 700. In such a manner, time-base signals of separated sub bands that are output from the inversely orthogonally transforming circuits 703, 704, and 705 are decoded into a signal of the entire band. Each of the band combining filters 701 and 702 may be composed of for example an IQMF (Inverse Quadrature Mirror Filter).

On the other hand, the time unit of highly efficiently encoded information is supplied from the input terminal 712 to a change value calculating circuit 713. The change value calculating circuit 713 calculates a change value (adding value) for a change of scale factor information necessary for adjusting a time-base reproduction level (such as a fade-in operation and a fade-out operation) in the time unit of the supplied highly efficiently encoded information. The calculated change value is supplied to the normalization information changing circuit 709.

Information of frame numbers (order) of encoded data is supplied to the change value calculating circuit 713 through the input terminal 712. The change value calculating circuit 713 obtains the frame number of a current frame in frames whose normalization information is changed. In reality, in consideration of channels, starting from the first frame that is designated to 0, the frames are numbered at intervals of 212 bytes as shown in FIG. 3. The change value calculating circuit 713 calculates a change value corresponding to the obtained frame number.

The normalization information changing circuit 709 outputs a value to be added or subtracted to/from scale factor information of each unit block. The normalization information changing circuit 709 performs a process for outputting a value to be added or subtracted to/from scale factor information corresponding to the change value supplied from the change value calculating circuit 713 and a process for outputting a value to be added or subtracted to/from scale factor information corresponding to a command issued by the user or the like through an operation panel or the like. One of these processes is performed by the normalization information changing circuit 709 corresponding to a command issued by the user or the like through the operation panel or the like.

As with the first embodiment shown in FIG. 1, when scale factor information is controlled with an adding operation or a subtracting operation of the calculating device 710, the level of reproduction data can be adjusted with an increment of for example 2 dB. For example, when the same values that are output from the normalization information changing circuit 709 are added or subtracted to/from scale factor information of all the unit blocks, the level of all the unit blocks can be adjusted with an increment of 2 dB. In this process, scale factor information generated as the result of an adding operation or a subtracting operation is limited to the range of scale factor values defined in the applied format.

For example, when different values that are output from the normalization information changing circuit 709 are added or subtracted to/from scale factor information of the individual unit blocks, the levels of the individual unit blocks can be separately adjusted. As a result, a filtering function can be accomplished. In more reality, when the normalization information changing circuit 709 outputs a pair of a unit block number and a value to be added or subtracted to/from the scale factor information of the unit block, unit blocks and values to be added or subtracted to/from scale factor information of the unit blocks are correlated.

Figure 10:
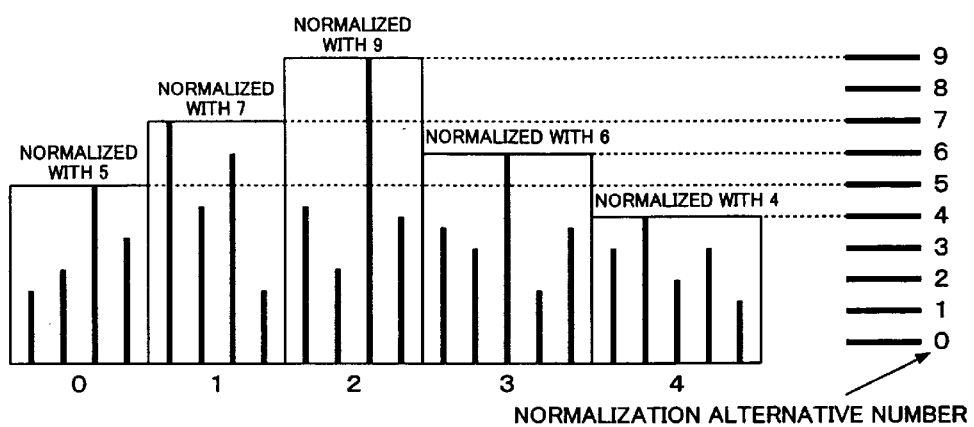
FIG. 10 is a graph showing normalization information whose sound field has not been processed.

When scale factor information is changed in the above-described manner, a level adjusting function and so forth for a decoded signal are accomplished. Next, such functions will be described in detail. First of all, a reproduction level adjusting function will be described. FIG. 10 shows an example of a normalizing process (block floating process) reflected to encoded data that is output from the adaptive bit allocation encoding circuits 106, 107, and 108. An alternative that is the maximum spectrum data or MDCT coefficient is selected from alternatives stored for each unit block in the memory or the like of the bit allocation calculating circuit 118. The number of the selected normalization alternative is defined as scale factor information of the unit block.

Such a process is performed for each unit block. In this case, it is assumed that the scale factor information of the block number 0 is 5 and the scale factor information of the block number 1 is 7. Likewise, the other blocks are correlated with scale factor information. As was described with reference to FIG. 3, scale factor information is written to encoded data.

Figure 11:
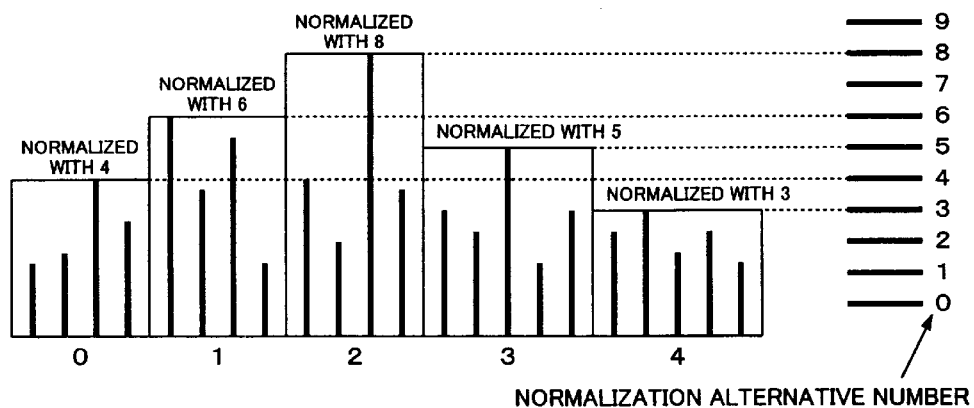
FIG. 11 is a graph showing a normalizing process in the case that a level is adjusted.

FIG. 11 shows an example of a process performed by the normalization information changing circuit 709 for scale factor information shown in FIG. 10. When the normalization information changing circuit 119 outputs the value "−1" for all unit blocks and the calculating devices 120, 121, and 122 add the value "−1" to scale factor information as shown in FIG. 10, spectrum data as shown in FIG. 11 is generated. Thus, the level adjusting process of which the signal level is decreased by for example 2 dB is performed.

Figure 12:
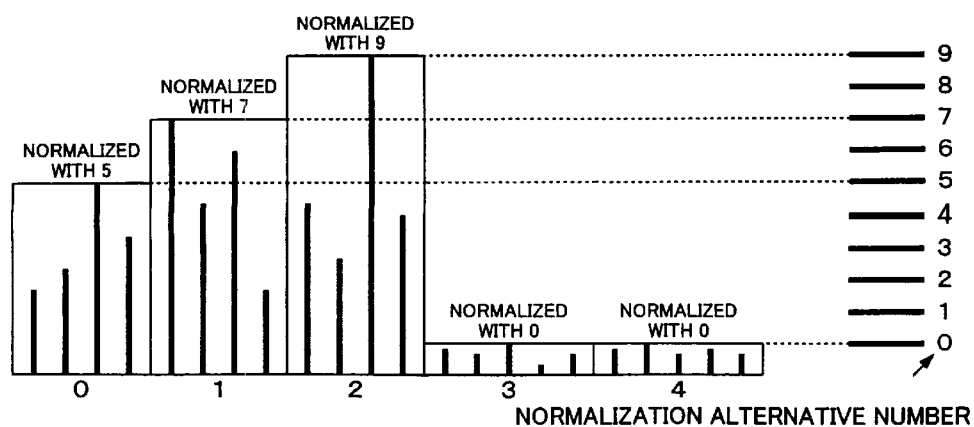
FIG. 12 is a graph showing a normalizing process in that case that a low pass filter process is performed.

FIG. 12 shows another example of a process performed by the normalization information changing circuit 709 for scale factor information contained in encoded data. As shown in FIG. 10, when the normalization information changing circuit 119 output the value "−6" for the block of the block number 3 and the value "−4" for the block of the block number 4 and then these values are added to scale factor information of the blocks of the block numbers 3 and 4, the scale factor values of the blocks of the block numbers 3 and 4 become "0" as shown in FIG. 12. As a result, a filtering process is performed. In the example shown in FIG. 12, by adding negative values (or subtracting positive values) to scale factor values, they become "0". Alternatively, a scale factor value of a desired block may be forcedly set to "0".

In the examples shown in FIGS. 10 to 12, the number of unit-blocks is five (unit block 0 to unit block 4) and the number of normalization alternatives is 10 (normalization alternative 0 to 9). However, in the format of a real record medium such as an MD (Mini Disc) that a magneto optical disc, the number of unit blocks is 52 (unit block 0 to unit block 51) and the number of normalization alternatives is 64 (normalization alternative 0 to normalization alternative 63). In such a range, by finely designating unit blocks and parameters for changing scale factor information and so forth, the level adjusting process, the filtering process, and so forth can be more precisely performed.

Figure 13:
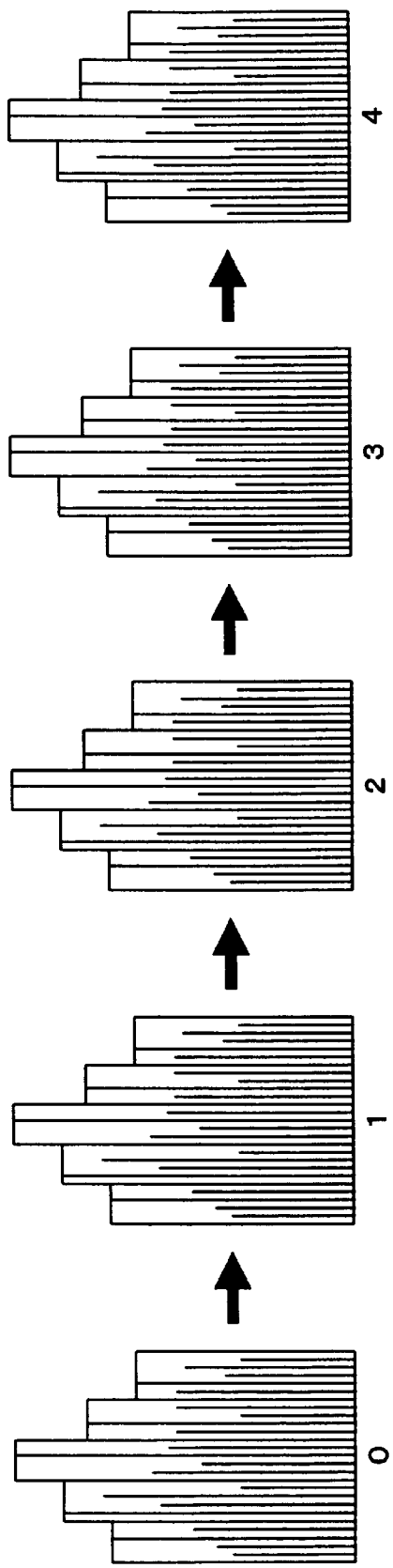
FIG. 13 is a schematic diagram showing a transition of normalization information whose sound file has not been processed.

In addition to the above-described process shown in FIGS. 10 to 12, according to the first embodiment and the second embodiment of the present invention, by changing a scale factor in the time base direction, for example a fading function, a wowing function, and so forth are accomplished. Next, an example of a scale factor changing process performed in the time base direction will be described. When scale factor information is not changed, as shown in FIG. 13, the scale factor information is output as encoded data in the order of frame 0 to frame 4 in the time base direction. In this example, it is assumed that each frame is composed of five blocks.

Figure 14:
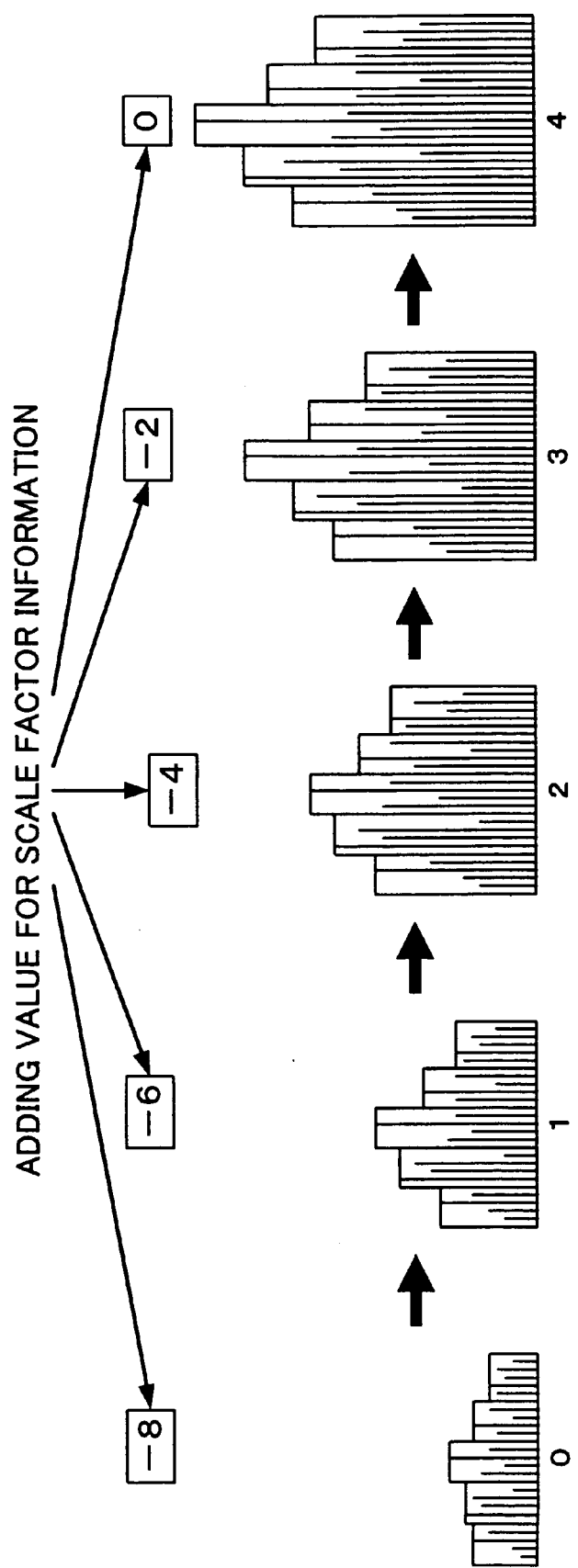
FIG. 14 is a schematic diagram showing a transition of normalization information in the case that a fading process is performed.

When the normalization information changing circuit 119 adds the value "−8" as a change value for scale factor information to the first frame (the frame 0 shown in FIG. 13) and increments the change value of each frame by the value "2", the change value of the frame 4 becomes "0". FIG. 14 shows data generated in such a process. In this example, the level increases in the time-base direction. As a result, the fade-in function is accomplished. For simplicity, in the example shown in FIGS. 13 and 14, spectrum data or MDCT coefficients of the frame 0 to frame 4 are the same. However, it is clear that the present invention can be applied to the case that spectrum data or MDCT coefficients of the frame 0 to frame 4 are different.

The above-described example is a very simple example. However, the normalization information changing circuit 119 can be more precisely designated for accomplishing a general fading function including a fade-out function. For example, since one frame is equivalent to around 11.6 msec, the relation between the number of frames and a desired level transition time period for a fade-in function or a fade-out function can be calculated by a dividing operation. Thus, corresponding to the calculated value, a desired level transition time period can be accomplished. In the above-described fade-in function, the level transition is performed corresponding to a straight line. Alternatively, the level transition may be performed corresponding to for example a sine curve or a logarithmic curve.

In addition, the start position or end position of a level transition in the fade-in process and the fade-out process can be designated with record positions (addresses) of encoded information. In such a manner, the function of the fader can be precisely performed.

According to the present invention, the transition start position or the transition end position of the fade process such as fade-out can be designated with a record position (address) of data, so that data of an outer region of a portion in which a fade process has been performed can be adequately processed.

In other words, when the transition end position of a track in which a fade-out process is performed is designated before the record end address of the track, after the fade-out process is processed, a region between the transition end position and the record end address is properly processed.

When the transition start position of a track in which the fade-in process is performed is designated after the record start address of the track, after the fade-in process is performed, a region between the transition end position and the record end address is properly processed.

In the example, one track represents a sequence of one music program.

In the embodiment that follows, the present invention is applied to an MD system.

Figures 15A, 15B:
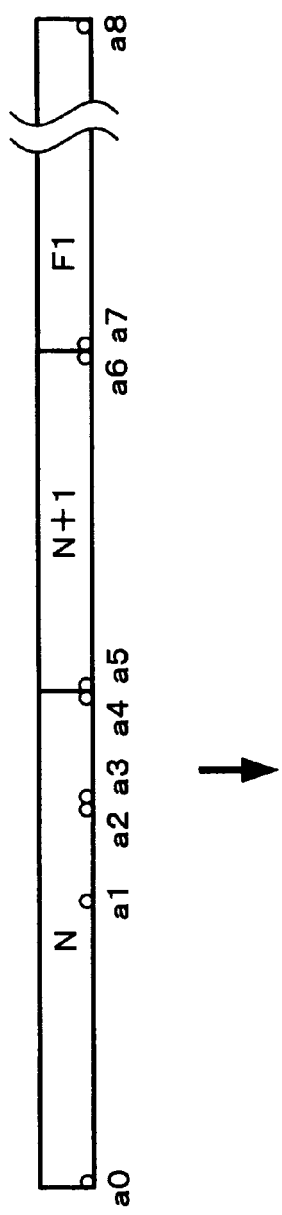
FIG. 15A is a schematic diagram showing a track on a disc, a fade-out process being performed for the track.
FIG. 15B is a schematic diagram showing a track on a disc, a fade-out process having been performed for the track.

Next, with reference to FIGS. 15A, 15B, 16A, 16B, 16C, and 16D, an outer portion of a fade-out portion—namely, a data portion preceded by a transition end position of the fade-out process will be described. In the initial state shown in FIG. 15A, a track N and a track (N+1) have been recorded on a record medium. In FIGS. 15A and 15B, a0, a1, a2, a3, a4, a5, and a6 represent addresses of a data record area of an MD. In the initial state, a0 represents the first address of the track N; a4 represents the last address of the track N; a5 represents the first address of the track (N+1); and a6 represents the last address of the track (N+1). A region F1 between the addresses a7 and a8 is a free area in which data can be written on the record medium.

FIG. 15B shows the state that a fade-out process of which the above described normalization information is adjusted is performed on the track N shown in FIG. 15A. In FIG. 15A, a1 represents a transition start address, whereas a2 represents a transition end address. When a2 does not match the last address a4 of the track N as shown in FIG. 15B, a hatched region between the address a3 and the address a4 can be handled in several manners as will be described later. The user can select a proper one from such handline manners.

Figure 16A:
FIG. 16A is a schematic diagram showing a process for the remaining area after the fade-out process has been performed according to a first embodiment of the present invention.
Figure 16B:
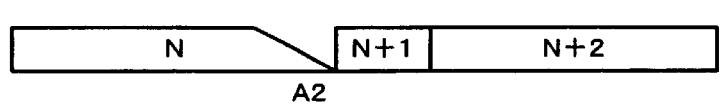
FIG. 16B is a schematic diagram showing a process for the remaining area after the fade-out process has been performed according to a second embodiment of the present invention.
Figure 16C:
FIG. 16C is a schematic diagram showing a process for the remaining area after the fade-out process has been performed according to a third embodiment of the present invention.
Figure 16D:
FIG. 16D is a schematic diagram showing a process for the remaining area after the fade-out process has been performed according to a fourth embodiment of the present invention.

Next, with reference to FIGS. 16A, 16B, 16C, and 16D, such manners will be described. FIG. 16A shows a handling manner of which the hatched region shown in FIG. 15B is left, not processed. FIG. 16B shows a handling manner of which the hatched region shown in FIG. 15B is treated as the track (N+1). FIG. 16C shows a manner of which the hatched region shown in FIG. 15B is erased. FIG. 16D shows a handling manner of which the hatched region shown in FIG. 15B is treated as a mute sound region. Next, real processes for accomplishing such handling manners will be described. First of all, an address management method of the MD system will be described. In the MD standard, sectors are managed with addresses in U-TOC. As will be described later, in the MD system, "erase" is accomplished by rewriting U-TOC so that a region to be erased can be handled as a recordable free area rather than rewriting record data (see FIG. 24).

Next, the address management for each sector will be described. First of all, with reference to FIGS. 17A and 17B, clusters as data record units of an MD will be described. One cluster has a linking area and a main data area. The linking area is composed of four sectors $S_{FC}$, $S_{FD}$, $S_{FE}$, and $S_{FF}$. The main data area is composed of 32 sectors $S_{00}$ to $S_{1F}$. In this case, one sector is a data unit composed of 2352 bytes. The linking area is used to record sub data and perform the linking function. On the other hand, the main data area is used to record data that the user uses—such as audio data—and TOC (Table of Content) data.

Figures 18A, 18B, 18C:
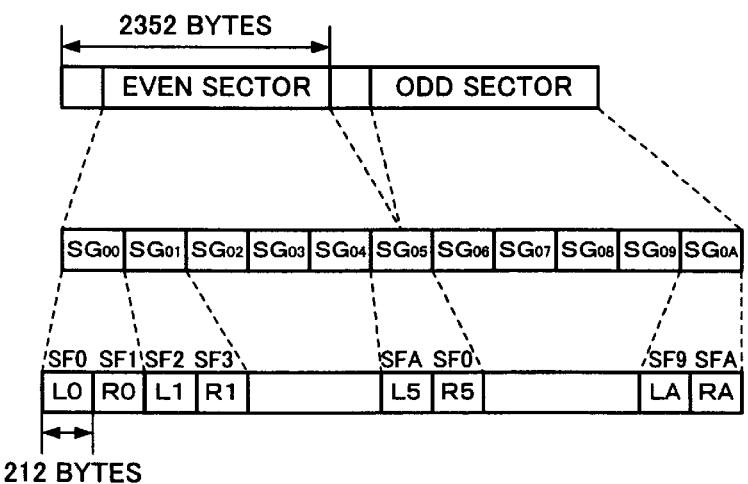
FIG. 18A is a schematic diagram showing the data structure of a pair of sectors.
FIG. 18B is a schematic diagram showing the data structure of sound groups.
FIG. 18C is a schematic diagram showing the data structure of sound frames composing a sound group.

As shown in FIGS. 18A and 18B, one sector is divided into sub units referred to as sound groups. Two sectors are divided into 11 sound groups. In other words, one sound group is recorded in two successive sectors. In reality, as shown in FIG. 18B, sound groups $SG_{00}$, $SG_{01}$, . . . , $SG_{0A}$ are recorded to even sectors $S_{00}$, $S_{02}$, . . . and odd sectors $S_{01}$, $S_{03}$, . . . One sound group is composed of 424 bytes of an amount of audio data equivalent to approx. 11.6 msec.

As shown in FIGS. 18B and 18C, one sound group SG is composed of data on the left channel and data on the right channel. For example, the sound group $SG_{00}$ is composed of left-channel data $L_0$ and right-channel data $R_0$. Likewise, the sound group $SG_{01}$ is composed of left-channel data $L_1$ and right-channel data $R_1$. 212 bytes of the data area of the left channel or right channel are referred to as sound frame. One sound frame is equivalent to one frame composed of 212 bytes as shown in FIG. 18C.

Next, TOC, which is management information of an MD, will be described. As TOC information, P-TOC (premastered TOC) and U-TOC (user TOC) are provided. P-TOC is formed at a pit area on the innermost periphery side of the disc. P-TOC is read-only information. With P-TOC, the positions of a recordable area of the disc, a U-TOC area, and so forth are managed. On the other hand, U-TOC is a magneto-optically recorded area. U-TOC is a readable and writable area of a conventional MD system. With U-TOC, an address management is performed for each sector. By rewriting U-TOC, an editing process can be performed. Next, U-TOC will be descried in detail.

According to the MD standard, eight sectors 0 to 7 can be formed in U-TOC. Each sector is composed of 2352 bytes. The sectors 1 and 4 are character information record areas. The sector 2 is a record date/time area. In such a manner, with these sectors, various types of information are managed. The sector 0 of U-TOC (hereinafter, simply referred to as sector 0) largely relates to an editing process. Thus, the sector 0 will be described in detail. The sector 0 is used to record a data record position of audio data and so forth that have been recorded and management information about a free area and so forth for recording new data.

FIG. 19 shows an example of the format of the sector 0. The sector 0 is composed of 588 slots #0 to #587. Each slot has four bytes (32 bits). Thus, the sector 0 is composed of data of 4×588=2352 bytes in total. In the first area of the slots #0 to #2, each byte is composed of all "0s" and all "1s" as a synchronous pattern. The synchronous pattern is followed by a cluster address composed of a high order address of one byte (Cluster H) and a low order address of one byte (Cluster L). The cluster address is followed by a sector address of one byte (Sector) and mode information of one byte in succession. The synchronous pattern, the cluster address, the sector address, and the mode information compose a header.

The header is followed by a maker code, a model code, a first track number (First TNO), a last track number (Last TNO), a sector used state (Used Sectors), a disc serial number, a disc ID, and so forth that are recorded at predetermined positions of the disc. The maker code represents the manufacturer of the disc. The model code represents the model of the disc. In addition, areas for various table pointer such as P-DFA (Pointer for Defective Area), P-EMPTY (Pointer for Empty Slot), and P-TNO1, P-TNO2, . . . , and P-TNO255 are formed as a correlation table designation data portion for correlating tracks for data such as audio data and tracks for free areas with a management table portion that will be described later.

As the management table portion correlated with the table pointers (P-DFA to P-TNO255), 255 part tables (01h), (02h), . . . and (FFh) are formed. In this example, a part represents a data portion of which chronologically successive data is physically successively recorded on the record medium. One track is composed of one or a plurality of parts. Each part table contains a start address, an end address, mode information (track mode), and link information of the current part. The start address and the end address are data that represent the start point and the end point of the current part, respectively. Each of the start address and the end address is composed of three bytes.

When the current part is linked to another part, the link information represents the part table number (one of 01h to FFh) of the part to be linked. With reference to such link information, even if one track is physically discontinuously divided into a plurality of parts, a reproducing operation can be performed in such a manner that the parts are successively accessed. Thus, one track can be properly reproduced. In other words, when one track is composed of three parts, they are reproduced in such a manner that they are linked corresponding to the link information. When data is recorded to an MD, the data is often divided into a plurality of parts so as to effectively use the data record area.

Next, the table pointers will be described in detail. The table pointer P-DFA represents a defective area of the MD. In other words, the table pointer P-DFA designates a part table number (one of 01h to FFh) of a part as a defective area (hereinafter, such a part is referred to as defective part). The designated part table contains the start address and the end address of the defective part.

When a plurality of defective parts disperse on the disc, link information of a part table designated by the P-DFA designates a part table number of a defective part. The designated part tables successively designate defective parts. A part table that designates the last defective part, which is not linked to another defective part, contains link information that does not designate a defective part. Such link information is for example 00h. In other words, when there are a plurality of defective parts, the part table designated by the P-DFA corresponds to the first defective part.

The table pointer P-EMPTY represents the first part table (one of 01h to FFh) of those that have not been used in the management table portion (such a part table is referred to as non-used part table). In other words, the table pointer P-EMPTY designates a non-used part table number. When there are a plurality of non-used part tables, link information of a part table designated by the P-EMPTY designates a part table number corresponding to another non-used part table. The designated part tables successively designate other non-used part tables. In such a manner, the management table portion recognizes all non-used part tables in such a manner that they are linked.

The table pointer P-FRA represents a free area in which data can be recorded on the MD. In other words, the table pointer P-FRA designates a part table number (one of 01h to FFh) of a part as a free area (hereinafter referred to as free area part). The designated part table contains the start address and the end address of the free area part. When there are a plurality of free area parts, link information of the part table designated by the table pointer P-FRA designates a part table number of another free area part. In such a manner, designated part tables successively designate free area parts. When the link information of a part table is 00h, it represents that there is no further free area part.

Next, with reference to FIGS. 20A and 20B, the management state of the sector 0 of U-TOC in the initial state shown in FIG. 15A will be described. FIG. 20A shows the correlation table designation data portion. FIG. 20B shows the management table portion. In FIGS. 20A and 20B, when one-byte data of table pointers and link information is 00h and three-byte data of start addresses and end addresses is 000000h, they are denoted by "–".

FIG. 20A shows a correlation table designation data portion representing that there is no defective part (P-DFA =00h) on the MD and that the part table number of the first non-used part is 04h. In addition, the correlation table designation data portion represents that the part table number of the first free area part is 03h. Moreover, the correlation table designation data portion represents that two tracks have been recorded and that the part table number of the first part of the first track and the part table number of the first part of the second track are 01h and 02h, respectively.

In FIG. 20B, the part table (01h) corresponds to a part of the first track designated by the P-TNO1 shown in FIG. 20A. (N) denoted at the right end of the part table (01h) represents that the current part table corresponds to the track N shown in FIG. 15A. The part table (01h) contains a0 and a4 as the start address and the end address of a part of the track N, respectively. Since the track N is recorded with only one part, the link information of the part table (01h) is 00h. The part table (01h) does not contain a track mode. In this example, since two tracks have been recorded, the relation N=1 is satisfied.

As represented by the P-TNO2 shown in FIG. 20A, the part table (02h) corresponds to a part of the second track. (N+1) denoted at the right end of the part table (02h) represents a part table corresponding to a part of the track (N+1) shown in FIG. 15A. The part table contains a5 and a6 as the start address and the end address of a part of the track (N+1). Since the track (N+1) is recorded with only one part, the link information of the part table (02h) is 00h. The part table (02h) does not contain a track mode.

The part table (03h) corresponds to a part of a free area as designated by the P-FRA shown in FIG. 20A. (F1) denoted at the right end of the part table (03h) represents a part table corresponding to a free area. The part table (03h) contains a7 and a8 as the start address and the end address of the free area part, respectively. The part table (04h) is the first non-used part table as designated by the P-EMPTY shown in FIG. 20A. In this example, the link information of the part table (04h) is (05h). The part tables (06h), (07h), . . . contain the next part table numbers as link information. Thus, all part tables followed by the part table (04h) are not used. In each non-used part table, all the three bytes assigned to each of the start address and the end address are 000000h. Thus, each of the non-used part tables is not correlated with any part of the MD. The track mode of each of the non-used part table is 00h as one byte.

Figure 21:
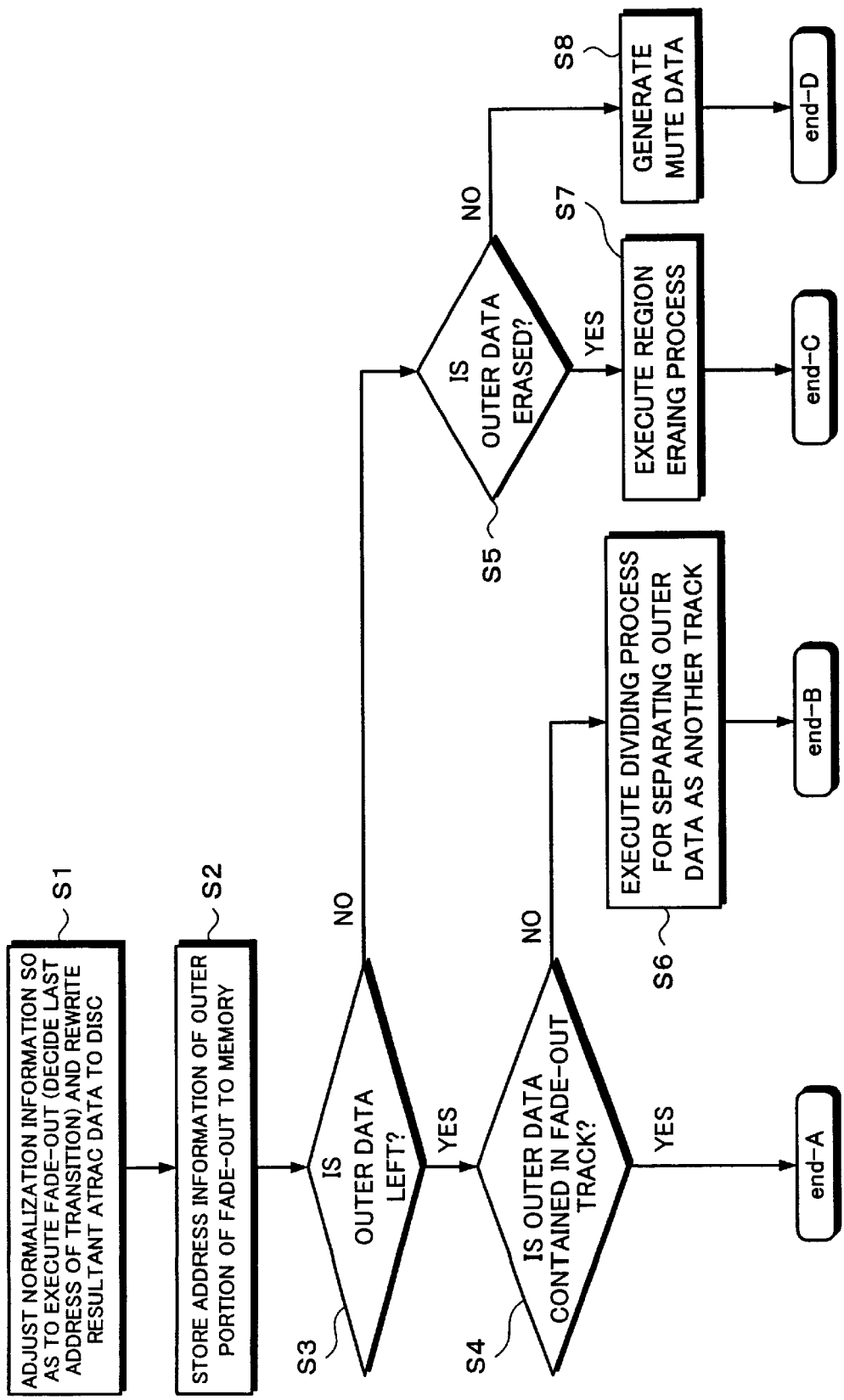
FIG. 21 is a flow chart showing each process for outer data that takes place in the fade-out process.

Next, with reference to FIG. 21, a process for adjusting normalization information in the initial state shown in FIG. 15A, designating a fade-out, accomplishing the state shown in FIG. 15B, and accomplishing the states shown in FIGS. 16A, 16B, 16C, and 16D will be described.

At step S1, the user selects a track for the fade-out process. The reproducing apparatus reproduces the vicinity of the last end of the selected track.

Figure 26:
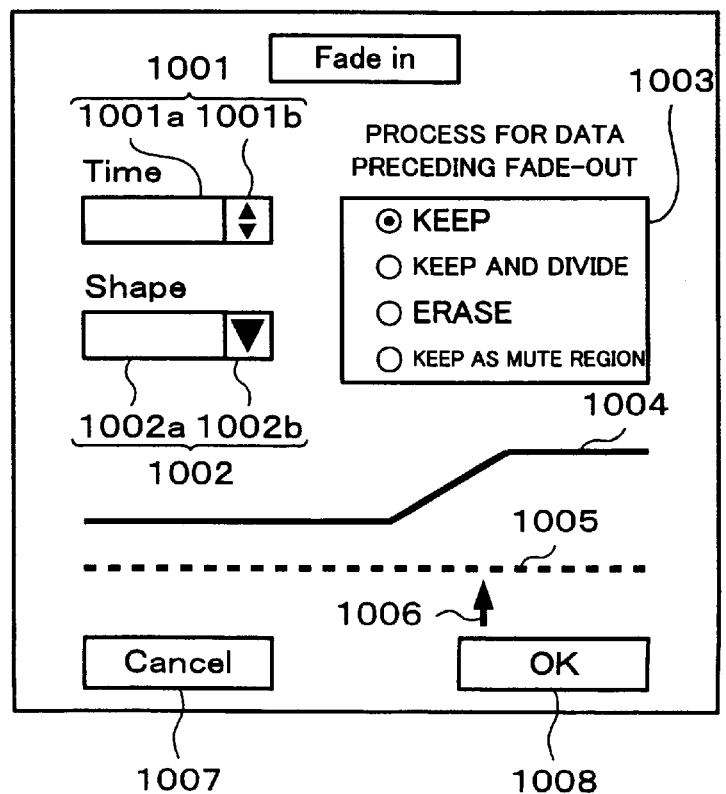
FIG. 26 is a detailed schematic diagram showing the operation screen on which the user operates in the editing process according to the present invention.

The user designates the transition start position and the transition end position for the fadeout process using an operating portion such as a mouse with reference to a GUI (Graphical User Interface) shown in FIG. 26 while listening to a track that is being reproduced.

When the transition start position and the transition end position are designated with the operating portion (such as a mouse), the record position of highly efficiently encoded audio data on the disc is stored to a predetermined memory.

In addition, with reference to the GUI (Graphical User Interface) shown in FIG. 26, the transition time, the transition shape, and so forth may be designated.

The highly efficiently encoded audio data in the region between the transition start position and the transition end position designated by the user is stored in the memory. In the memory, the normalization information is adjusted and rewritten. The resultant audio data is rewritten to the original position of the disc.

The rewriting process is performed corresponding to the record position of highly efficiently encoded audio data reproduced from the disc when the transition start positon and the transition end positon are designated by the operating portion, the record position being read from the memory.

Thereafter, the flow advances to step S2. At step S2, in addition to the last address (a2 in FIG. 15B) of the fade-out transition, address information such as the start address (a3 shown in FIG. 15B) of the outer portion of the fade-out (namely, a hatched data portion shown in FIG. 15B referred to as outer data) is stored in a memory or the like of the apparatus. Thereafter, the flow advances to step S3. At step S3, the user is prompted whether or not the outer data is left. When the determined result at step S3 is Yes (namely, the outer data is left), the flow advances to step S4. Otherwise, the flow advances to step S5.

At step S4, the user is prompted whether or not the outer data is contained in the track on which the fade-out process has been performed. When the determined result at step S4 is Yes (namely, the user has input data designating that the outer data is contained in the track of which the fade-out process has been performed), the process is completed as end-A. Otherwise, the flow advances to step S6. In the case of end-A, the outer data is left and the state as shown in FIG. 16A is accomplished. In other words, the outer data is in the same track of which the fade-out process has been performed. In this case, the sector 0 of U-TOC is not changed from the state shown in FIGS. 20A and 20B.

At step S6, a dividing process of which the outer data is treated as another track is performed. Thereafter, the process is completed as end-B. In the case of end-B, the state shown in FIG. 16B is accomplished. In other words, the outer data is left. The outer data is treated as a new track different from the track of which the fade-out process has been performed.

At step S5, the user is prompted whether or not the outer data is erased. When the determined result at step S5 is Yes (namely, the user has input data representing that the outer data is erased), the flow advances to step S7. Otherwise, the flow advances to step S8. At step S7, a region erasing process is performs so as to erase outer data. Thereafter, the precess is completed as end-C. In the case of end-C, the state shown in FIG. 16C is accomplished. In other words, the outer data is erased. At step S8, a process for causing the outer data to be mute data is performed. In reality, zero-data is rewritten to the outer data. Alternatively, a process for setting the scale factor corresponding to the outer data to 0 is performed. At step S8, the contents of the sector 0 of U-TOC are not changed. Thereafter, the process is completed as end-D. In the case of end-D, the state shown in FIG. 16D is accomplished. In other words, the outer data is treated as mute data.

Next, the process at step S6 will be practically descried. At step S6, as shown in FIGS. 22A and 22B, the contents of the sector 0 of U-TOC are rewritten. In FIGS. 22A and 22B, changed portions are hatched. Since the track number of the first track N is not changed, the contents of the P-TNO1 shown in FIG. 22A are not changed. However, the end address of the first track N in the part table (01h) becomes a2. In the process, the end address of the first track N is changed from a4 in the initial state (see FIGS. 15A and 20B) to a2 as the last address of the transition in the fade-out process.

The contents of the P-TNO2 shown in FIG. 22A are changed so that the part table (04h) shown in FIG. 22B is designated as the second track (N+1). The part table (04h) shown in FIG. 22B represents a3 and a4 as the end address and the start address of the track (N+1), respectively. In this process, the outer data is treated as the track (N+1).

The P-TNO3 shown in FIG. 22A is newly recorded so that the part table (02h) shown in FIG. 22B is designated as the third track (N+2). In this case, the part table (02h) shown in FIG. 22B is a part table corresponding to the second track (N+1) in FIG. 20. In the process, in the initial state shown in FIG. 15A, the second track (N+1) in the initial state is treated as the third track (N+2). In addition, the P-EMPTY represents (05h). In the process, a rewriting process is performed since the first non-used part table of the management table portion becomes (05h) as the part table (04h) is newly used.

In the above-described process, when the outer data is treated as a new track, the track (N+1) is used as an example. In other words, the new track number can be selected in the range of the total track number. When many tracks whose track numbers exceed N (namely, tracks (N+1), (N+2), . . . ) have been recorded, as the outer data is treated as a new track (N+1), the next tracks are changed to for example tracks (N+2), (N+3), . . .

Figures 23A, 23B, 24:
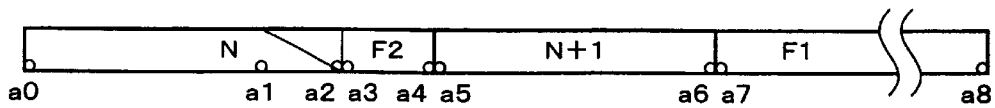
FIG. 23A is a schematic diagram showing the data structure of the correlation table designation data portion in the case that outer data is erased after the fade-out process has been performed.
FIG. 23B is a schematic diagram showing the data structure of the management table portion in the case that outer data is erased after the fade-out process has been performed.
FIG. 24 is a schematic diagram showing the case that outer data is erased on the disc after the fade-out process has been performed.

Next, the process at step S7 will be described in detail. In the above-described region erasing process, the contents of U-TOC are rewritten so as to treat parts between two addresses in which data has been recorded in a record area of the record medium as a free area. At step S7, the contents of the sector 0 of U-TOC are rewritten as shown in FIGS. 23A and 23B. In FIGS. 23A and 23B, changed portions are hatched. Since the track number of the track N is not changed, the contents of the P-TON1 are not changed. However, in the part table (01h) shown in FIG. 23B, the end address of the track N is changed to a2. In other words, the end address of the track N is changed from a4 in the initial state (see FIGS. 15A and 20B) to a2.

The link information of the part table (03h) designated in the P-FRA shown in FIG. 23A is rewritten to (04h). In the part table (04h) shown in FIG. 23B, parts between the address a3 and the address a4 are newly designated. In the process, parts for the outer data are designated as a new free area F2. Since the link information of the part table (03h) is rewritten to 04h, the linking relation between the free area F1 and the free area F2 is maintained. The outer data is treated as a recordable region. The contents of the P-EMPTY are changed to 05h. In the process, since a part table (04h) is newly used, the first non-used part table of the management table portion becomes (05h).

FIG. 24 shows a record area of the MD corresponding to the sector 0 of U-TOC shown in FIGS. 23A and 23B. The user or the like can know such a state as shown in FIG. 16C. Thus, as the result of step S7, the state shown in FIG. 16C is accomplished. In such a process, when the user or the like is prompted for the transition end position of the fade-out, before the final setup is performed, the increase of the free area and the total capacity of the free area may be calculated corresponding to the end position that has been temporarily designated so and the calculated result may be displayed for the user or the like. Thus, the user can know how the recordable time increases as the result of the erasing process for the outer data of a recorded track. Consequently, in the state that an MD has several recorded tracks and a free area for three minutes and that the user wants to newly record data such as a music program for four minutes, he or she can perform the erasing process for the outer data for one or a plurality of tracks. Thus, since the recordable time increases, the data for four minutes can be recorded.

In the above description, a simple case that there are two recorded tracks, each recorded track is composed of one part, there is no defect region, a free area is successively formed, and no track mode information has been recorded was assumed. Such an assumption was made for simple description. Thus, it should be noted that the present invention can be applied to a more complicated case. For example, the present invention can be applied to the case that a track N is composed of a plurality of parts and they are reproduced in such a manner that they are linked.

Next, the editing operation according to the embodiment of the present invention will be described in reality. In this example, it is assumed that an audio component system that includes recording/reproducing functions for a record medium such as an MD (Mini Disc) and that handles various types of sound sources (audio data and so forth of record mediums such as a CD (Compact Disc) and a magnetic tape and of a radio broadcast) is connected to a personal computer that is operated by the user or the like.

Figure 25:
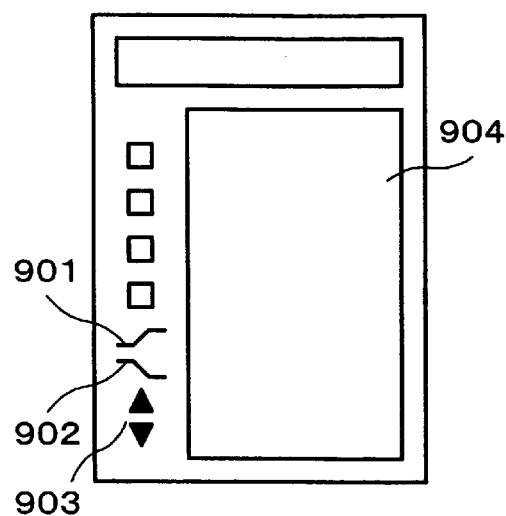
FIG. 25 is a schematic diagram showing an operation screen on which the user operates in an editing process according to the present invention.

FIG. 25 shows a first operation screen. The first operation screen is displayed on the monitor of the personal computer. The first operation screen has several display portions that can be operated with the mouse or the like. In FIG. 25, an icon 901 is an icon for a fade-out operation. When the icon 901 is clicked, the fade-out operation is performed. An icon 902 is an icon for a fade-out operation. When the icon 902 is clicked, the fade-out operation is performed. An icon 903 is an icon for a level adjusting operation. When the icon 903 is clicked, the level adjusting operation is performed. The other icons are used for editing operations such as a dividing operation (for dividing one track into two portions), a joining operation (for joining two tracks), a moving operation (for changing the track number of a track), and an erasing operation (for erasing a track so as to treat it as of a recordable free area). A display frame 904 is used to list tracks recorded on an MD. A desired track is selected with the mouse on the display frame 904. In other words, on the first operation screen, an editing operation, a track selecting operation, and so forth can be performed.

FIG. 26 shows a second operation screen. The second operation screen is displayed on the monitor of the personal computer. The second operation screen has several display frames on which numeric values can be input with the clicking operation of the mouse or the like. In FIG. 26, a display frame 1001 is a display frame for designating time data. In a display frame 1001*a,* a fade-out time is displayed. When an up triangle button and a down triangle button shown in the display frame 1001*a* are clicked with the mouse, the fade-out time can be increased and decreased, respectively. The fade-out time can be designated in the range from for example 1 sec. to 15 sec. with an increment of 0.1 sec. A display frame 1002 is a display frame for designating a fade-out shape. When a triangle button in an indication 1002*b* is clicked with the mouse, several fade-out shapes are displayed. With a draw-and-drop operation, a desired fade-out shape can be selected. Examples of the fade-out shapes are a linear shape (the amount of a level change per unit time is constant) or a non-linear shape.

A display frame 1003 is used to select a process performed for outer data when the fade-out process is performed. In this example, as shown in FIGS. 16A, 16B, 16C, and 16D, one of four operations that are "keep", "keep and divide", "erase", and "keep as mute region" can be selected. An indication 1004 represents a fade-out shape. In this example, the selected fade-out shape is a linear shape. With the display frame 1002 or the like, another fade-out shape can be selected.

In addition, with the indication 1004, a fade start position and a fade end position can be changed with the dragging operation of the mouse. Thus, when the fade length is changed, the value in the display frame 1001*a* is changed correspondingly thereto. An indication 1005 roughly indicates the time position of the track. When the time position indicated with an arrow 1006 is changed with the dragging operation of the mouse, the time position of the fade-out track can be varied.

A display frame 1010 displays a recordable capacity, a recordable time, and so forth. With the display frame 1010, the user can know a recordable capacity in the case that the outer data erasing process is performed after the fade-out process is performed. In addition, the display frame 1010 may display an increase of a recordable capacity or a recordable time as the result of the outer data erasing process is performed after the fade-out process is performed.

After designating operations for the display frames are performed, a trial reproducing operation corresponding to the designating operations is performed. This reproducing operation is referred to as rehearsal reproducing operation. The rehearsal reproducing operation is repeatedly performed until the user changes the designated conditions or clicks a display frame 1008. In this example, the number of times of the rehearsal reproduction operation can be designated. When the designated conditions are changed, the rehearsal reproducing operation is performed corresponding to the newly designated conditions. When the display frame 1008 is clicked with the mouse, the designated conditions on the second operation screen are confirmed. With the confirmed designated conditions, for example a process for rewriting scale factors of a record medium is performed. When a display frame 1007 is clicked with the mouse, the designating operations are canceled and the second operation screen is switched to the first operation screen shown in FIG. 25.

In the above-described example, it was assumed that an audio component system is connected to a personal computer with which the user operates the audio component system. Alternatively, the user may operate the audio component system through an operation panel thereof or an infrared ray remote controller thereof. In this case, the input operation is performed with input buttons and/or a pointing device. When numeric values are input with a jog dial, the operability of the audio component system is improved.

According to the above-described embodiment of the present invention, the editing process for handling outer data is performed in a user's desired method. In addition, the present invention can be applied to an editing process for handling outer data as the result of the fade-in process— namely data in the region between the start address of a track for the fade-in process and the transition start address for the fade-in process.

Figure 27:
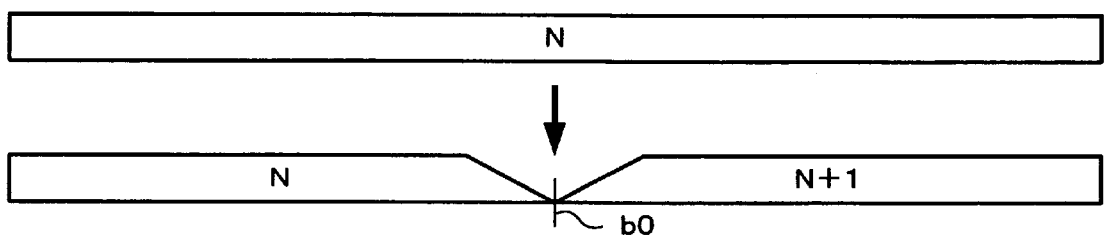
FIG. 27 is a schematic diagram showing the state that the fade-out process and the fade-in process are performed at a track divide point on the disc.

Alternatively, both the fade-in process and the fade-out process may be performed for one track so as to handle outer data as the results of the processes in a user's desired method. In other words, as shown in FIG. 27, a fade process is executed in such a manner that address b0 of track N is designated to the transition end address of the fade-out process and the transition start address of the fade-in process. Thereafter, the region between the start address and b0 of the track N in the initial state is treated as the track N. The region between b0 and the last address of the track N in the initial state is treated as the track (N+1). In such a manner, the original track may be divided.

FIG. 28 is a block diagram showing the internal structure of a recording and reproducing unit 102 as the structure of an MD recorder/player 1.

The MD recorder/player 1 can record and reproduce audio data to/from a magneto-optical disc (MD) 90.

The MD 90 shown in FIG. 28 is a disc housed in a disc cartridge DK. A shutter mechanism is disposed in the disc cartridge DK. When data is recorded or reproduced, the shutter mechanism is opened. Thus, light is radiated from an optical pickup (optical head 3). In addition, a magnetic field of a magnetic head is applied to the disc.

The MD 90 is rotated and controlled at CLV (constant linear velocity) by a spindle motor 2.

In the specification, "recordable/reproducible position" represents the position of which the MD 90 is held in a rotatable and drivable state by the spindle motor 2.

The optical head 3 is disposed at a position opposite to a magnetic head 6*a* through the MD 90 (loaded magneto-optical disc). The optical head 3 has an objective lens 3*a,* a two-axis mechanism 4, a semiconductor laser (not shown), and a light receiving portion (not shown). Light emitted from the semiconductor laser is reflected on the surface of the MD 90. The reflected light is received by the light receiving portion.

The two-axis mechanism 4 has a focus coil and a tracking coil. The focus coil causes the objective lens 3*a* to be driven in the direction of the MD 90. The tracking coil causes the objective lens 3*a* to be driven in the radius direction of the MD 90.

The MD recorder/player 1 also has a thread mechanism 5. The thread mechanism 5 causes the entire optical head 3 to be largely moved in the radius direction of the MD 90.

Information of reflected light detected by the light receiving portion of the optical head 3 is supplied to an RF amplifier 7. The RF amplifier 7 performs a current—voltage converting process and a matrix calculating process. Thereafter, the RF amplifier 7 generates a focus error signal FE, a tracking error signal TE, and an RF signal.

The RF signal that is a reproduced signal is generated corresponding to a magnetic field vector detected using the magnetic Kerr effect of reflected light of light emitted to the MD 90 with a lower laser power than the record mode.

The focus error signal FE and the tracking error signal TE generated by the RF amplifier 7 are supplied to a servo circuit 9. The servo circuit 9 compensates the phase and adjusts the gain. The resultant signal is supplied to the focus coil and the tracking coil through a drive amplifier (not shown).

The servo circuit 9 generates a thread error signal with the tracking error signal TE through an LPF (low pass filter). The thread error signal is supplied to the thread mechanism 5 through a thread drive amplifier (not shown).

The RF signal generated by the RF amplifier 7 is supplied to an EFM/CIRC encoder and decoder 8. The EFM/CIRC encoder and decoder 8 digitizes and EFM (eight to fourteen modulation)-demodulates for the RF signal. Thereafter, the EFM/CIRC encoder and decoder 8 performs a CIRC (cross interleave Reed Solomon coding) error correcting process for the demodulated signal. The resultant signal is supplied to a memory controller 12.

On the MD 90, grooves have been wobbled at a predetermined frequency (in this example, at 22.05 kHz) and FM modulated address data has been recorded.

The address data is extracted by an address decoder 10. The address decoder 10 FM-demodulates the address data through a BPF (band pass filter) that passes only a predetermined frequency component.

The EFM/CIRC encoder and decoder 8 generates a spindle error signal for rotating and controlling the disc with the digitized EFM signal or the address data extracted by the address decoder 10 and supplies the spindle error signal to the spindle motor 2.

In addition, the EFM/CIRC encoder and decoder 8 controls a PLL (phase locked loop) operation corresponding to the digitized EFM signal and generates a reproduction clock signal for the decoding process.

The memory controller 12 writes digitized data that has been error-corrected to a buffer memory 13 at a transmission rate of 1.4 Mbits/sec.

When data that exceeds a predetermined amount is stored to the buffer memory 13, the memory controller 12 reads data from the buffer memory 13 at a transmission rate of 0.3 Mbits/sec that is much lower than the write transmission rate and outputs the data as audio data.

Since data is temporarily stored to the buffer memory 13 and then output as audio data, even if the optical head 3 cannot successively read data because of an undesired track jump or the like due to an outer disturbance of for example vibrations, data necessary for the reallocation of the optical head 3 to the address at which the track jump has taken place is stored in the buffer memory 13. Thus, audio data can be successively output.

When a 4 Mbyte RAM is used for the buffer memory 13, data of up to 10 seconds can be stored in the buffer memory 13 in the full state.

The memory controller 12 is controlled by a system controller 11. Data that is read from the MD 90 has been compressed in a predetermined compressing method (for example, ATRAC (Adaptive transform acoustic coding) method). Data that is read from the buffer memory 13 under the control of the memory controller 12 has been decompressed by an audio compression encoder and decompression decoder 14. The decompressed digital data is supplied to a D/A converter 15.

The D/A converter 16 converts the digital data that has been decompressed by the audio compression encoder and decompression decoder 14 into an analog audio signal. The analog audio signal is supplied from an output terminal 16 to a reproduced data output system (not shown). The reproduced data output system is for example an amplifier, a speaker, a headset, and so forth. The reproduced audio data output system outputs an audio sound.

In such a reproducing operation, the system controller 11 supplies various servo commands to the servo circuit 9 corresponding to operations of an operating portion 19. In addition, the system controller 11 supplies control commands for the buffer memory 13 to the memory controller 12. Moreover, the system controller 11 controls a displaying portion 20 to display character information such as performance elapsed time and a title of a reproduced program. In addition, the system controller 11 causes the EFM/CIRC encoder and decoder 8 to control the spindle servo operation and the decoding process.

In addition to the operating portion 19, the MD recorder/player 1 has a remote commander 25. The remote commander 25 allows the user to perform various operations of the MD recorder/player 1. The remote commander 25 outputs a command as for example an infrared modulated signal corresponding to a user's operation. An infrared ray receiving portion 23 converts the command—namely, operation information—into an electric signal and supplies the electric signal to the system controller 11.

The system controller 11 performs a required controlling process corresponding to the operation information received from the infrared ray receiving portion 23.

When the MD recorder/player 1 records audio data such as a music program to the MD 90, the audio signal is supplied to an input terminal 17 or an input terminal 21.

An analog audio signal that is output from an analog output terminal of a reproducing apparatus such as a CD player is supplied to the input terminal 17. An A/D converter 18 converts the analog audio signal received from the input terminal 17 into a digital signal and supplies the digital signal to the audio compression encoder and decompression decoder 14.

A digital audio signal that is received from a digital output terminal of a reproducing apparatus such as a CD player is supplied to the input terminal 21. In this case, a digital interface portion 25 decodes the digital audio signal corresponding to a digital communication format and extracts control data. The digital audio signal that has been extracted by the decoding process is supplied to the audio compression encoder and decompression decoder 14.

According to the embodiment of the present invention, the digital interface portion 25 is based on the IEC 958 format. The digital interface portion 25 receives a digital audio signal through an optical cable.

The audio compression encoder and decompression decoder 14 compression-encodes the digital audio signal corresponding to the ATRAC (Adaptive transform acoustic coding) method. The compressed digital audio signal is temporarily stored to the buffer memory 13 through the memory controller 12 at a transmission rate of 0.3 Mbits/sec.

When the memory controller 12 has determined that the data stored in the buffer memory 13 exceeds the predetermined amount, the memory controller 12 allows the data to be read from the buffer memory 13.

The compressed data that is read from the buffer memory 13 is supplied to the EFM/CIRC encoder and decoder 8. The EFM/CIRC encoder and decoder 8 adds a CIRC error correction code to the compressed data and performs a process such as an EFM modulating process for the resultant data. The resultant data is supplied to a magnetic head driving circuit 6.

The magnetic head driving circuit 6 causes the magnetic head 6a to perform the N/S pole magnetic field applying operation for the supplied data corresponding to the supplied data.

When data is recorded by such a magnetic field applying operation, the system controller 11 controls the radiation power of a semiconductor laser (not shown) of the optical head 3 so that the radiation power becomes higher than that in the reproducing operation in such a manner that the surface of the MD 90 is heated up to the Curie temperature. Thus, the magnetic field information applied from the magnetic head 6a is fixed to the record surface of the disc. In other words, data is recorded as magnetic field information.

When data is recorded, the system controller 11 supplies various servo commands to the servo circuit 9, supplies control commands for the buffer memory 13 to the memory controller 12, causes the displaying portion 20 to display such as a record elapsed time and a recorded program track number, and causes the EFM/CIRC encoder and decoder 8 to control the spindle servo operation and the encoding process.

When input digital data is processed, control data is received from the digital interface portion 25.

When an input analog signal is processed, the analog audio signal is received from the input terminal 17 to a mute sound detecting portion 22. A mute sound state between programs as the input audio signal is monitored. The monitored information is supplied to the system controller 11.

The MD recorder/player 1 is connected to a personal computer PC 101 through an IEEE 1394 cable.

The user operates an operating portion such as a mouse of the personal computer with reference to an GUI screen on the display of the personal computer as shown in FIG. 26. A command signal corresponding to the operation is supplied to the system controller 11 through an IEEE 1394 interface 28.

A RAM 24 stores an address of the MD 90 for a track corresponding to a region for the fade-out process designated with a mouse operation on the PC while the user is listening to a reproduced audio signal in the vicinity of the last end portion of the track.

According to the embodiment of the present invention, the transition start address a1 and the transition end address a2 shown in FIG. 15B are stored.

In addition, the record address of the track of which the fade-out process is performed is stored to the RAM 24.

In the above-described embodiment, the start address a0 and the end address a4 of the track N shown in FIG. 15B are stored.

A ROM 27 is composed of for example a non-volatile memory or the like. The contents of the ROM 27 is rewritable under the control of the system controller 11. Even if the power of the ROM 27 is stopped, the contents thereof can be kept. The ROM 27 stores a program and various types of data with which the system controller 11 accomplishes various processes.

The operating portion 19 allows the user to perform various operations for the MD recorder/player 1. The operating portion 19 has operation switches for various operations including playback, pause, fast forward, record, stop, track delete, track combine, track divide, and character information input such as track name and disc name. A command signal corresponding to an operation for the operating portion 19 is transmitted to the system controller 11. The system controller 11 performs a predetermined controlling process corresponding to the command signal.

A region between the transition start address a1 and the transition end address a2 designated corresponding to a user's mouse operation on the PC is reproduced and stored to the memory RAM 13. The highly efficiently encoded data stored in the buffer memory 13 is data shown in FIG. 3.

The system controller 11 supplies normalization information corresponding to the fade-out process through the memory controller 12. The normalization information contained in the compressed data stored in the memory RAM 13 is successively rewritten.

The highly efficiently encoded compressed data containing the normalization information rewritten in the memory RAM 13 is FM-modulated by the magnetic head driving portion 6 through the EFM/CIRC encoder 8 and recorded to the MD 90 by the magnetic head 6a.

The position recorded on the MD 90 is rewritten corresponding to the transition start address a1 and the transition end address a2 stored in the RAM 24.

The system controller 11 compares the transition end address a2 stored in the RAM 24 with the end address a4 of the track N stored corresponding to the U-TOC information and detects the region between the transition end address a2 and the end address a4 (this region is hatched in FIG. 15B).

The system controller 11 generates the U-TOC information so as to divide the detected region between the transition end address a2 and the end address a4 as shown in FIG. 16B or delete the region thereof as shown in FIG. 16C and records the generated U-TOC information to the U-TOC area of the MD 90 through the EFM/CIRC encoder 8, the magnetic head driving circuit 6, and the magnetic head 6a.

The U-TOC information reproduced from the U-TOC area of the MD 90 may be stored to the RAM 24 or the RAM 13.

When a music sound signal is recorded to the region between the transition end address a2 and the end address a4, the scale factor information of the highly efficiently encoded compressed data stored in the RAM 13 may be rewritten to all null.

The above description is based on an MD system. However, the present invention is not limited to the MD system. In other words, the present invention can be applied to an editing apparatus that performs an editing process for record data such as a fade process and that performs a track managing process of a record medium using its address. The applicability of the present invention does not depend on a recording method of data such as an encoding method.

According to the present invention, after the edit position of a first editing process for changing normalization information such as scale factor information is accurately obtained, a desired second editing process can be performed.

Thus, when a second editing process performed for record data in a region between an edit position of a first editing process such as a fade-out process and a desired position is performed (for example, the data is designated as a new track, the data is erased (treated as a recordable region), or the data is left as a mute sound region), the edit position of the first editing process can be accurately affected to the second editing process. Thus, the second editing process can be accurately and easily performed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. An editing apparatus for editing a highly efficient encoded digital signal recorded on a record medium having a program area for recording programs and a management area for recording management information, each of the programs being composed of a digital signal containing at least normalization information that has been highly efficiently encoded corresponding to normalization information, quantization coefficients, and quantization data calculated for each of a plurality of signal components divided in time-base direction and/or frequency-base direction, the management information being used to manage at least a record start position and a record end position of each of the programs recorded on the program area, comprising:

operating means for designating an edit start position and an edit end position to vicinities of end portions of a predetermined program recorded in the program area of the record medium;

reproducing means for reproducing a digital signal between the edit start position and the edit end position corresponding to the vicinities of the end portions of the predetermined program recorded in the program area of the record medium;

changing means for changing normalization information contained in the digital signal reproduced by said reproducing means;

recording means for substituting the normalization information changed by said changing means with the normalization information contained in the digital signal reproduced by said reproducing means and re-recording the substituted normalization information to the record medium to the vicinities of the end portions of the predetermined program recorded in the program area of the record medium corresponding to the edit start position and the edit end position; and management information editing means for editing the management information recorded in the management area of the record medium against the vicinities of the end portions of the predetermined program recorded in the program area of the record medium corresponding to the edit start position and the edit end position.

2. The editing apparatus as set forth in claim 1, wherein said changing means changes normalization information so that a fade-out process is performed for the vicinity of the end portion of the predetermined program recorded in the program area of the record medium, the end portion being designated by said operating means.

3. The editing apparatus as set forth in claim 1, wherein said changing means changes normalization information so that a fade-in process is performed for the vicinity of the start position of the predetermined program recorded in the program area of the record medium, the start portion being designated by said operating means.

4. The editing apparatus as set forth in claim 1, wherein said management information editing means edits management information so that a region between the edit end position of the predetermined program recorded in the program area of the record medium, the edit end portion being designated by said operating means, and the record end position of the predetermined program designated by said operating means is managed as one program when the edit end position of the predetermined program recorded in the program area of the record medium designated by said operating means is followed by the record end position of the predetermined program designated by said operating means.

5. The editing apparatus as set forth in claim 1, wherein said management information editing means edits management information so that a region between the edit end position of the predetermined program recorded in the program area of the record medium, the edit end portion being designated by said operating means, and the record end position of the predetermined program designated by said operating means is managed as a recordable area when the edit end position of the predetermined program recorded in the program area of the record medium designated by said operating means is followed by the record end position of the predetermined program designated by said operating means.

6. The editing apparatus as set forth in claim 5, further comprising:

displaying means for displaying a recordable capacity that increases as a result that said management information editing means edits the management information so that the region between the edit end position of the predetermined program recorded in the program area of the record medium, the edit end position being designated by said operating means, and the record end position of the predetermined program designated by said operating means is managed as the recordable area.

7. The editing apparatus as set forth in claim 5, further comprising:

displaying means for displaying an increase amount of a recordable capacity that increases as a result that said management information editing means edits the management information so that the region between the edit end position of the predetermined program recorded in the program area of the record medium, the edit end position being designated by said operating means, and the record end position of the predetermined program designated by said operating means is managed as the recordable area.

8. The editing apparatus as set forth in claim 1, wherein data that represents that a reproduction level is zero or almost zero is recorded in a region a region between the edit end position of the predetermined program recorded in the program area of the record medium, the edit end portion being designated by said operating means, and the record end position of the predetermined program designated by said operating means is managed as a recordable area when the edit end position of the predetermined program recorded in the program area of the record medium designated by said operating means is followed by the record end position of the predetermined program designated by said operating means.

9. The editing apparatus as set forth in claim 1, wherein said management information editing means edits management information so that a region between the record start position of the predetermined program designated by said operating means and the edit start position of the predetermined program recorded in the program area of the record medium, the edit start position being designated by said operating means, is managed as one program when the edit start position of the predetermined program recorded in the program area of the record medium, the edit start position being designated by said operating means, is preceded by the record start position of the predetermined program designated by said operating means.

10. The editing apparatus as set forth in claim 1,
wherein said management information editing means edits management information so that a region between the record start position of the predetermined program designated by said operating means and the edit start position of the predetermined program recorded in the program area of the record medium, the edit start position being designated by said operating means, is managed as a recordable area when the edit start position of the predetermined program recorded in the program area of the record medium, the edit start position being designated by said operating means, is preceded by the record start position of the predetermined program designated by said operating means.

11. The editing apparatus as set forth in claim 10, further comprising:
displaying means for displaying a recordable capacity that increases as a result that said management information editing means edits the management information so that the region between the record start position of the predetermined program designated by said operating means and the edit start position of the predetermined program recorded in the program area of the record medium, the edit start position being designated by said operating means, is managed as the recordable area.

12. The editing apparatus as set forth in claim 10, further comprising:
displaying means for displaying an increase amount of a recordable capacity that increases as a result that said management information editing means edits the management information so that the region between the record start position of the predetermined program designated by said operating means and the edit start position of the predetermined program recorded in the program area of the record medium, the edit start position being designated by said operating means, is managed as the recordable area.

13. The editing apparatus as set forth in claim 1,
wherein data representing that a reproduction level is zero or almost zero is recorded in a region between the record start position of the predetermined program designated by said operating means and the edit start position of the predetermined program recorded in the program area of the record medium, the edit start position being designated by said operating means, is managed as one program when the edit start position of the predetermined program recorded in the program area of the record medium, the edit start position being designated by said operating means, is preceded by the record start position of the predetermined program designated by said operating means.

14. An editing method for editing a highly efficient encoded digital signal recorded on a record medium having a program area for recording programs and a management area for recording management information, each of the programs being composed of a digital signal containing at least normalization information that has been highly efficiently encoded corresponding to normalization information, quantization coefficients, and quantization data calculated for each of a plurality of signal components divided in time-base direction and/or frequency-base direction, the management information being used to manage at least a record start position and a record end position of each of the programs recorded on the program area, comprising the steps of:
reproducing a digital signal between the edit start position and the edit end position corresponding to the vicinities of the end portions of the predetermined program recorded in the program area of the record medium;
changing normalization information contained in the digital signal reproduced at the reproducing step;
substituting the normalization information changed at the changing step with the normalization information contained in the digital signal reproduced at the reproducing step and re-recording the substituted normalization information to the record medium to the vicinities of the end portions of the predetermined program recorded in the program area of the record medium corresponding to the edit start position and the edit end position; and
editing the management information recorded in the management area of the record medium against the vicinities of the end portions of the predetermined program recorded in the program area of the record medium corresponding to the edit start position and the edit end position.

15. The editing method as set forth in claim 14,
wherein the changing step is performed by changing normalization information so that a fade-out process is performed for the vicinity of the end portion of the predetermined program recorded in the program area of the record medium, the end portion being designated by the user.

16. The editing method as set forth in claim 14,
wherein the changing step is performed by changing normalization information so that a fade-in process is performed for the vicinity of the start position of the predetermined program recorded in the program area of the record medium, the start portion being designated by the user.

17. The editing method as set forth in claim 14,
wherein the management information editing step is performed by editing management information so that a region between the edit end position of the predetermined program recorded in the program area of the record medium, the edit end portion being designated by the user, and the record end position of the predetermined program designated by the user is managed as one program when the edit end position of the predetermined program recorded in the program area of the record medium designated by the user is followed by the record end position of the predetermined program designated by the user.

18. The editing method as set forth in claim 14,
wherein the management information editing step is performed by editing management information so that a region between the edit end position of the predetermined program recorded in the program area of the record medium, the edit end portion being designated by the user, and the record end position of the predetermined program designated by the user is managed as a recordable area when the edit end position of the predetermined program recorded in the program area of the record medium designated by the user is followed by the record end position of the predetermined program designated by the user.

19. The editing method as set forth in claim 18, further comprising the step of:
displaying a recordable capacity that increases as a result that the management information editing step is performed by editing the management information so that the region between the edit end position of the predetermined program recorded in the program area of the record medium, the edit end position being designated by the user, and the record end position of the predetermined program designated by the user is managed as the recordable area.

20. The editing method as set forth in claim 18, further comprising the step of:

displaying an increase amount of a recordable capacity that increases as a result that the management information editing step is performed by editing the management information so that the region between the edit end position of the predetermined program recorded in the program area of the record medium, the edit end position being designated by the user, and the record end position of the predetermined program designated by the user is managed as the recordable area.

21. The editing method as set forth in claim 14, wherein data that represents that a reproduction level is zero or almost zero is recorded in a region a region between the edit end position of the predetermined program recorded in the program area of the record medium, the edit end portion being designated by the user, and the record end position of the predetermined program designated by the user is managed as a recordable area when the edit end position of the predetermined program recorded in the program area of the record medium designated by the user is followed by the record end position of the predetermined program designated by the user.

22. The editing method as set forth in claim 14, wherein the management information editing step is performed by editing management information so that a region between the record start position of the predetermined program designated by the user and the edit start position of the predetermined program recorded in the program area of the record medium, the edit start position being designated by the user, is managed as one program when the edit start position of the predetermined program recorded in the program area of the record medium, the edit start position being designated by the user, is preceded by the record start position of the predetermined program designated by the user.

23. The editing method as set forth in claim 14, wherein the management information editing step is performed by editing management information so that a region between the record start position of the predetermined program designated by the user and the edit start position of the predetermined program recorded in the program area of the record medium, the edit start position being designated by the user, is managed as a recordable area when the edit start position of the predetermined program recorded in the program area of the record medium, the edit start position being designated by the user, is preceded by the record start position of the predetermined program designated by the user.

24. The editing method as set forth in claim 14, wherein data representing that a reproduction level is zero or almost zero is recorded in a region between the record start position of the predetermined program designated by the user and the edit start position of the predetermined program recorded in the program area of the record medium, the edit start position being designated by the user, is managed as one program when the edit start position of the predetermined program recorded in the program area of the record medium, the edit start position being designated by the user, is preceded by the record start position of the predetermined program designated by the user.

25. The editing method as set forth in claim 14, further comprising the step of:

displaying a recordable capacity that increases as a result that the management information editing step is performed by editing the management information so that the region between the record start position of the predetermined program designated by the user and the edit start position of the predetermined program recorded in the program area of the record medium, the edit start position being designated by the user, is managed as the recordable area.

26. The editing method as set forth in claim 14, further comprising the step of:

displaying an increase amount of a recordable capacity that increases as a result that the management information editing step is performed by editing the management information so that the region between the record start position of the predetermined program designated by the user and the edit start position of the predetermined program recorded in the program area of the record medium, the edit start position being designated by the user, is managed as the recordable area.

27. An editing apparatus for editing a highly efficient encoded digital signal recorded on a record medium having a program area for recording programs and a management area for recording management information, each of the programs being composed of a digital signal containing at least normalization information that has been highly efficiently encoded corresponding to normalization information, quantization coefficients, and quantization data calculated for each of a plurality of signal components divided in time-base direction and/or frequency-base direction, the management information being used to manage at least a record position of each of the programs recorded on the program area, comprising:

operating means for selecting a program to be edited and an edit region;

reproducing means for reproducing a digital signal including at least normalization information corresponding to the edit region selected by said operating means and management information from a management area of the record medium;

first storing means for storing the management information for managing at least record positions of individual programs, the management information being reproduced from the management area of the record medium;

second storing means for storing a digital signal including at least normalization information reproduced by said reproducing means;

rewriting means for rewriting normalization information in a digital signal including at least normalization information stored in said second storing means;

controlling means for overwriting a digital signal including normalization information rewritten by said rewriting means to the record medium corresponding to management information stored in said first storing means;

comparing means for comparing the record position of a program to be edited, the record position being stored in said first storing means with an edit region selected by said operating means; and selecting means for detecting a remaining area as an edited result corresponding to the compared result of said comparing means and for selecting a process type for the detected remaining area.

28. The editing apparatus as set forth in claim 27, wherein the process type for the remaining area selected by said selecting means is one of not operation, a dividing process, an erasing process, a recording process for mute sound data.

* * * * *

UNITED STATES PATENT AND TRADEMARK OFFICE
CERTIFICATE OF CORRECTION

PATENT NO. : 6,407,972 B1
DATED : June 18, 2002
INVENTOR(S) : Tomohiro Koyata et al.

It is certified that error appears in the above-identified patent and that said Letters Patent is hereby corrected as shown below:

Column 3,
Line 26, change "the-contents" to -- the contents --;
Line 40, change "positon" to -- position --.

Column 10,
Line 37, change "unit blocks unit blocks" to -- unit blocks --;
Line 41, change "bites" to -- bits --.

Column 13,
Line 58, change "potted" to -- plotted --.

Column 19,
Line 54, change "descried" to -- described --.

Column 22,
Lines 38 and 39, change "positon" to -- position --.

Column 23,
Line 9, delete "is";
Line 10, change "precess" to -- process --;
Line 13, change "zero-data" to -- zero data --;
Line 21, change "descried" to -- described --.

Column 32,
Line 40, change "a region a region" to -- a region --.

UNITED STATES PATENT AND TRADEMARK OFFICE
CERTIFICATE OF CORRECTION

PATENT NO. : 6,407,972 B1
DATED : June 18, 2002
INVENTOR(S) : Tomohiro Koyata et al.

It is certified that error appears in the above-identified patent and that said Letters Patent is hereby corrected as shown below:

<u>Column 35,</u>
Line 12, change "a region a region" to -- a region --.

Signed and Sealed this

Eleventh Day of February, 2003

JAMES E. ROGAN
*Director of the United States Patent and Trademark Office*